(12) United States Patent
Vilchek et al.

(10) Patent No.: US 11,369,933 B2
(45) Date of Patent: Jun. 28, 2022

(54) DEVICE WITH ANNULAR SPOUTED FLUIDIZED BED AND OPERATING METHOD THEREFOR

(71) Applicant: SIA "EMPYRIO", Riga (LV)

(72) Inventors: Sergei Iurevich Vilchek, Novosibirsk (RU); Fedor Nikolaevich Storozhev, Novosibirsk (RU); Alexandr Georgievich Kvashnin, Novosibirsk (RU)

(73) Assignee: SIA "EMPYRIO", Riga (LV)

( * ) Notice: Subject to any disclaimer, the term of this patent is extended or adjusted under 35 U.S.C. 154(b) by 66 days.

(21) Appl. No.: 16/765,884

(22) PCT Filed: Nov. 27, 2017

(86) PCT No.: PCT/RU2017/000880
§ 371 (c)(1),
(2) Date: May 21, 2020

(87) PCT Pub. No.: WO2018/111151
PCT Pub. Date: Jun. 21, 2018

(65) Prior Publication Data
US 2021/0387154 A1    Dec. 16, 2021

(51) Int. Cl.
*B01J 8/24* (2006.01)
*B01J 8/38* (2006.01)
*F23C 10/02* (2006.01)
*F26B 17/14* (2006.01)

(52) U.S. Cl.
CPC ............. *B01J 8/245* (2013.01); *B01J 8/386* (2013.01); *F23C 10/02* (2013.01); *F26B 17/1483* (2013.01); *B01J 2208/00557* (2013.01)

(58) Field of Classification Search
CPC ..... B01J 8/245; B01J 8/24; B01J 8/386; B01J 2208/00557; C04B 2/106; F23C 10/02; F23C 10/06; F23C 10/12; F23C 10/14
See application file for complete search history.

(56) References Cited

U.S. PATENT DOCUMENTS

| | | | |
|---|---|---|---|
| 5,006,584 | A | 4/1991 | Davis |
| 8,192,688 | B2 | 6/2012 | Hagen et al. |
| 2011/0206563 | A1 | 8/2011 | Wyatt, Jr. et al. |
| 2012/0205288 | A1 | 8/2012 | Jia et al. |
| 2013/0267747 | A1 | 10/2013 | Leroy et al. |

FOREIGN PATENT DOCUMENTS

| | | |
|---|---|---|
| RU | 2545330 C2 | 3/2015 |
| RU | 2569301 C2 | 11/2015 |
| SU | 162462 A2 | 4/1964 |
| WO | 2011106303 A1 | 9/2011 |

*Primary Examiner* — Lessanework Seifu

(57) ABSTRACT

A device with annular spouted fluidized bed can be used for carrying out the majority of the technical processes carried out in fluidized bed devices. The reaction chamber of the device has, throughout at least a part of its height, a downwardly tapering funnel shape with step-structured inner surface. The shape of the reaction chamber, together with the tangential admission thereto of fluidized and other gases, makes it possible to create, in the reaction chamber, an adjustable toroidal fluidized bed, in which the rotation rate of the particles of the material undergoing treatment can be adjusted in both horizontal and vertical planes, and also makes it possible to control the dwell time of particles of different sizes in the reaction zone, the intensity with which materials are treated, and other process parameters.

20 Claims, 9 Drawing Sheets

DEVICE WITH ANNULAR SPOUTED FLUIDIZED BED AND OPERATING METHOD THEREFOR

TECHNICAL FIELD

The present invention relates to a device with rotating annular spouted boiling (fluidized) bed, and specifically to the reaction chamber thereof, for carrying out various chemical reactions (technical processes), inter alia for purifying gas mixtures, drying materials, pyrolysis, gasification, and combusting solid fuels (such as industrial waste, agricultural waste, MSW, coal, sewage sludge, aerobic and anaerobic digestion reactor waste, etc.), and also for carrying out other technical processes to perform in a fluidized bed.

BACKGROUND

Spouting of particulate matter in ascending airflow is a kind of fluidization implemented in cylindroconical or conical devices.

If compared to other fluidization reactors, devices with spouted fluidized beds have several advantages. In particular, they are better suited for treatment of both polydisperse materials and finely dispersed particles that are hard to fluidize in other fluidization devices.

At the same time, devices with spouted fluidized beds have some drawbacks if compared to other fluidization reactors. One of the key disadvantages is their lower performance since their treatment zone is limited to the spout volume, which is fixed by using the devices with annular spouts. However, if the annulus radius is too large compared to the bed where the spout is generated, a blowby may occur at some point of the annulus. To reduce the possibility of a blowby, additional rotation around the vertical axis of the spout is introduced to stabilize the spout, but it also causes centrifugal forces to drive the particles of the treated matter away from the spout. The heavier (larger) a particle, the quicker it is removed from the spout, despite these heavy and large particles require the longest time to be properly treated. In other words, the particles in the rotating spouts are separated in a specific way, i.e. the largest particles are quickly driven away from the spout to the periphery, where they sink back to the base of the spout and then are picked up again. The circulation of these large particles from the spout to the periphery (where they are not properly treated) and back to the spout reduces the device's performance.

Increasing the treatment intensity and reducing the dwell time of materials in the device with annular rotating spouted fluidized bed via additional treatment of the materials outside the spout but inside the device (in particular, on its inner surface) is among the objectives of the present invention.

In reactors with annular rotating spouted fluidized beds, the so-called fluidized bed in the form of annular rotating spout is formed in their fluidization chambers. It consists of a turbulent gas medium where non-gaseous (solid and/or liquid) particles are distributed. Thanks to the turbulence, condensed non-gaseous and gas phases in the fluidized bed are properly mixed facilitating optimal mass and heat transfer and provide proper interaction between materials.

In most cases, fluidizing gas ascends from the bottom through the chamber. The device to let the fluidizing gas into the chamber (gas inlet port) is followed by the reactor's constrained area used for generating a spout of fluidized material. Design-wise, this constrained area is a part of the reactor bottom and includes either a (perforated) fluidization plate, a nozzle, or a set of nozzles (hereinafter, nozzle bottom). The nozzle bottom is designed to provide a sufficient gas flow rate to prevent solid-phase particles deposition on the bottom and ensure uniform gas flow distribution across the nozzle bottom surface.

The drawbacks of the nozzle bottom design are its complexity requiring high labor intensity of manufacturing as well as regular inspections and maintenance.

A fluidizing chamber, which may be cylindrical or conical in shape or combine a conical part and a cylindrical part mounted on its top, is placed over the nozzle bottom to form a chamber where most of the reactor's technical processes take place and for that reason, it is hereinafter referred to as the reaction chamber.

In the center of the reaction chamber is usually a solid rod or pipe shaped as a body of revolution with its axis coinciding with that of the reaction chamber. The body gets through the nozzle bottom and may or may not reach the top (lid) of the chamber to generate an annular spout. If the body is a pipe, it may also act as a gas duct to remove treatment products and waste gases from the reaction chamber, and as a dedicated space to perform additional technical operations.

Gases and treatment products are removed from the reaction chamber through the chamber's lid, using the methods known in the art.

To prevent a fluidizing—gas blowby (concentration) at any point of the annulus, the annular spouted fluidized bed rotates around the axis of the reaction chamber. The rotation is executed by a nozzle bottom of dedicated design which increases the overall complexity of the nozzle bottom. Therefore, having a nozzle bottom leads to a significantly more complex design of the device that is one of the disadvantages of the solutions known in the art.

The devices with rotating annular spouted fluidized beds known in the art have yet another significant drawback. The velocities of the solid and fluid particles moving within the spout around the chamber's axis (central pipe) have a rotational (tangential) component, i.e. the particles are affected by the centrifugal forces driving the particles from the spout's central part to its periphery and forming an excessive gas flow with short of non-gaseous particles in the central part of the spout. At the same time, a relative excess of non-gaseous particles emerges at the periphery near the chamber's walls, which leads to the gases and condensed (non-gaseous) particles interact under different conditions in the central and wall-adjacent parts of the spout. Among other things, this non-homogeneity results in treatment rate non-uniformity between different zones of the spout.

The adverse effects of said drawback are manifested most notably when the device's power (performance) is adjusted. Increasing the power leads to higher gas flow through the reactor, which, in its turn, increases circumferential velocities in the spout, and the centrifugal forces affecting non-gaseous (condensed) particles. Eventually, it leads to increased treatment rate non-uniformity between the chamber's center and its wall-adjacent parts.

There have been several solutions of this kind known to the art so far.

One of such solutions is the annular shaft furnace for burning fragmented remains (patent EP 2180280, IPC C04B2/00, F27B1/16, published on Apr. 28, 2010) that has outer and inner cylinders forming an annular shaft for material to be burnt. The combustion chambers are arranged in the plane of the burners on the outer cylinder, which also embraces axillary combustion lances (tuyeres) placed between adjacent combustion chambers and moving inside the shaft. The furnace features a rather complex design.

Another solution known to the art is a fluidized-bed device with a reactor for production of suspended matter (patent FR 2937886, IPC F23C10/10, published on May 7, 2010). The reactor has a cylindrical or polygonal shell and embraces the remixing profiles implemented as annular edges and distributed at least over a portion of the shell's height. The device may not have a fluidizing grid. The reactor's disadvantage is incomplete combustion of the fuel, which is overcome by its repeated circulation through the device, but this solution increases the number of devices in a processing set as well as power consumption during its operation. Moreover, it has problems with initiation after a sudden stop.

Another method known to the art is burning carbonaceous materials containing volatile substances (WO2006003454, published on Jan. 12, 2006) that includes: (I) providing a toroidal-bed reactor consisting of a chamber with an inlet and an outlet; (II) providing a pulverized—fuel burner whose inlet is connected directly or indirectly to the chamber's outlet; (III) feeding of carbonaceous material into the toroidal—bed chamber through the inlet; (IV) generating predominantly circumferential fluid flow in the chamber to cause the carbonaceous material to rapidly circulate around the chamber's axis in the toroidal bed and to heat it, so the material is eventually converted into a mixture containing gas and finely dispersed particles; (V) removing the mixture from the chamber through the outlet and supply it directly or indirectly to the burner through the burner's inlet; and (VI) combusting the mixture in the burner.

To implement this method, a device for burning carbonaceous materials containing volatile substances is proposed that consists of:
(a) a toroidal-bed reactor, including (I) a chamber with an inlet for feeding carbonaceous materials into the chamber, (II) means for heating the contents of the chamber, and (III) means for generating predominantly circumferential fluid flow within the chamber to create a rapid circulation of carbonaceous materials around the axis of the chamber in the toroidal bed, so the material is subjected to pyrolysis and sintering to produce a mixture containing gas and finely dispersed particles, and (IV) an outlet for discharging the mixture from the chamber; and
(b) a burner for combustion of pulverized fuel with an inlet connected directly or indirectly to the outlet of the chamber.

The drawback of the considered method is the equipment's low performance due to the inefficient use of the working volume of the reaction chamber. Moreover, the proposed reactor does not allow for a wide-range adjustment of the fluidized bed's parameters, which prevents one from reaching the required treatment depth.

Another solution known to the art is a fluidized bed reactor for burning fuel or waste and carrying out various chemical reactions (patent RU 2403966, IPC B01J8/24, published Nov. 20, 2010). The fluidizing chamber in the reactor shell has a conical insert. The inner surface of the shell and the exterior surface of the insert form a space with annular cross-section that acts as a fluidizing chamber and where the gas flow rate either remains constant, decreases, or increases depending on the relative positions of the shell and the insert. Stable operating conditions for the reactor are ensured within a wide range of loads due to the optimal distribution of gas and solid-state phases, the conditions for the removal of solid-state sinters are improved, and the adverse effect of fluctuations in the gas flow on the system operation is minimized.

The drawback of this solution is the reactor's manufacturing complexity, especially of the mechanism to enable inner inset movement since the insert is designed to be capable of that. This solution requires a large number of mechanical parts, which further reduces the reliability of the design, especially if its elements are operated at high temperatures. The device's ability to adjust fluidized—bed parameters is also insufficient since it is limited to adjusting fluidizing—gas flow.

To overcome this drawback, gas is additionally supplied through the walls of the reaction chamber at several levels along the chamber's height, as in the device (AS USSR N° 162462, IPC F26B, published on Apr. 16, 1964), which is the closest technical solution, given the combination of features. This device's drawback is the low heat and mass transfer efficiency because the largest particles move downward at maximum velocities near the walls of the reaction chamber reducing their interaction time with the gas flows guided through the chamber's walls since the vertical velocity component of fluidized particles in the spouted fluidized bed ascends in the central part of the spout and descends at the periphery. Another reason for the drawback is the absence of spout rotation around the vertical axis of the chamber.

One of the problems solved by the present invention is increasing peripheral particles dwell time in the gas flow to increase the uniformity of treatment of fluidized particles in the spout.

Technically, solving the problem leads to an increase in the heat and mass transfer rates, making it possible to adjust the intensity (height) of the spout, the rotation speed of the spout around the axis, the rotation speeds of the spout in different sections along its height, as well as the speed, intensity of treatment, and dwell time of materials both inside and outside the spout, including those driven away from the spout to its periphery and moving down toward the base of the spout.

This technical result will reduce the treatment time, increase the speed and depth of reagent treatment in the device with rotating annular spouted fluidized bed.

SUMMARY

Thus, the problems solved by the present invention are the development of an improved device with rotating annular spouted fluidized bed that makes it possible to adjust spout parameters, such as its dimensions (including height); the intensity relative to the amount of gas passing through the spout per unit time; direction and speed of rotation of the spout around its axis; tangential, radial and vertical (axial) speeds of the spout in different sections along its height; dwell time of the treated reagents and, if available, materials in the spout; the intensity of interaction of materials in various phases among themselves and with each other; as well as the ability to adjust (control) the speed of the reagents; treatment intensity of the reagents; dwell time of the reagents outside the spout, including those driven away from the spout to its periphery and moving towards the bottom (base) of the spout. The proposed device should also be able to operate in a wide range of loads, start and stop smoothly, start smoothly after sudden stops, and also handle most of the technical processes carried out in fluidized—bed devices. The device should have a simple design and be inexpensive.

The stated problem has been solved by developing a device with annular spouted fluidized bed that has at least one feed channel for reagents, fluidizing gases and, if necessary, materials; a vertically oriented reaction chamber 2 of downwardly tapering funnel shape throughout at least a portion of its height; a pipe 5, coaxial with the reaction chamber 2 and with at least one hole 6 for removing the treatment products.

The inner surface 3 of the reaction chamber 2 has a stepped structure; the pipe 5 is guided through the bottom 17 of the reaction chamber 2. The pipe 5 may end inside the reaction chamber 2 or may be guided through the reaction chamber 2 and further through the lid. In addition, the device is equipped with the channels 9 passing through the body 3a of the reaction chamber 2, their main function is to supply fluidizing gases. In some technical processes, the channels 9 may be used to supply materials and/or reagents.

It is preferable that the stepped structure of the innermost surface 3 of the reaction chamber 2 is formed in such a way the inner space of the reaction chamber 2 is shaped as regular polyhedrons, e.g. regular prisms and/or regular truncated pyramids coaxial with the reaction chamber 2 and mounted on each other's top.

It is preferable that at least one section of ordered polyhedron structure is along the height of the reaction chamber 2.

It is preferable that the ordered polyhedron structure within the downwardly tapering funnel-shaped portion of the reaction chamber 2 is formed in a way that for any two adjacent polyhedrons sharing a common base plane, the radius of the circle inscribed in the polygon at the base of the upper polyhedron is not shorter than the radius of the circle circumscribed about the polygon at the base of the lower polyhedron.

It is preferable that the ordered polyhedron structure is formed in a way that all regular polyhedrons have regular polygons with the same number of sides at their base.

It is preferable that the corresponding sides of the bases of all regular polyhedrons are parallel.

It is preferable that each lower polyhedron is rotated around the axis of the reaction chamber 2 with respect to the adjacent upper polyhedron to be at a certain angle from the parallel position of the respective sides of the bases and a portion of the pipe 5 within the reaction chamber 2 is shaped as a body of revolution relative to the axis of the reaction chamber 2.

It is preferable that the pipe 5 is guided through the bottom 17 and lid 7 of the reaction chamber 2, and the holes 6 for the removing treatment products, fluidizing gases and, if available, materials, are placed in the upper part of the pipe 5 on its side surface.

It is preferable that the pipe 5 is guided through the bottom 17 of the reaction chamber 2 and does not reach the lid 7, and treatment products, fluidizing gases and, if available, materials are removed using the hole 6 formed by the open upper end of the pipe 5.

It is preferable that the device has an additional hole in the bottom 17, coaxial with the hole for the outlet of the pipe 5 through the bottom 17, which makes it possible to remove a part of the treatment products from the reaction chamber 2.

It is preferable that the outlets of the channels 9 into the reaction chamber 2 are arranged in a predetermined order along the height and perimeter of the reaction chamber 2.

It is preferable that the outlets of the channels 9 into the reaction chamber 2 are located near the vertical edges of the polyhedrons.

It is preferable that no more than two outlets of different channels 9 are located near each vertical edge of the polyhedron.

It is preferable that each outlet of channel 9 into the reaction chamber 2 is arranged in a way that the gas flowing from channel 9 is directed mainly along one of the faces of the polyhedron that forms the edge adjoining the channel outlet to the reaction chamber 2.

It is preferable that membranes are installed between the shell 1 and body 3a of the reaction chamber 2 to provide independent gas supply through the channels 9. Membranes may be horizontal or vertical.

It is preferable that ramps 16 are located at the bottom 17 of the reaction chamber 2 to drive the reagent particles and, if available, materials into the spouted bed.

It is preferable that the device is used for any of the following applications: purification of gas mixtures of any kind; burning of gaseous, liquid, solid fuel or waste in the spouted bed; pyrolysis; thermal gasification; technical processes using catalysts, adsorbers, and absorbers for separation, chemical reactions and drying of bulk materials in the spouted bed.

The stated problem has been solved using the reagent treatment method in application to a device with annular spouted fluidized bed, which implies feeding reagents and, if available, materials into the device, supplying fluidized gases to the device, generating a rotating annular spouted fluidized bed from reagents and, if available, materials, treatment of reagents in the device and removal of treatment products, fluidizing gases and, if available, materials from the device.

Reagent treatment is carried out in the device, both in the annular spouted fluidized bed and outside the spouted bed on the step-structured inner surface 3 of the reaction chamber 2.

It is preferable that fluidizing gas supply to the reaction chamber 2 is controlled by changing such parameters of technological processes as the speed and/or amount of fluidizing gases supplied to the channels 9.

It is preferable that the treatment on the inner surface of the reaction chamber 2 is carried out in a way the flow of fluidizing gases, reagents, and materials is supplied to the step 13 of the reaction chamber 2 through the channels 9 to move the particles of reagents, materials, and treatment products at a certain speed from one step to another and into the spouted bed, the process is carried out until the specified degree of reagent treatment is achieved, and then the treatment products, fluidizing gases and, if available, materials are removed through the holes 6, in the top section of the pipe 5.

It is preferable that the fluidizing gases are supplied to the reaction chamber 2 depending on the treatment conditions in the reaction chamber 2 within each step 13 or a group of steps 13.

It is preferable that additional treatment of the products and/or reagents supplied from the reaction chamber 2 is carried out in the pipe 5.

The technical result of the claimed solution consists in developing of an improved device with rotating annular spouted fluidized bed, which makes it possible to adjust spout parameters, such as its dimensions (including height), intensity, direction and rotation speed of the spout around its axis; the ability to adjust the tangential, radial and vertical (axial) speeds of the spout in different sections along its height; the dwell time of the fluidized particles in the spout; the intensity of interaction of fluidized particles among each other and with fluidizing gases; as well as the ability to adjust the speed, intensity of reagent treatment and dwell time of reagents outside the spout, including those driven away from the spout to the periphery on the inner surface of the reaction chamber and moving down toward the bottom (base) of the spout.

The aspects of the claimed device and method is illustrated in drawings FIG. 1 through 15.

In FIG. 1, the reaction chamber 2 of the device with a rotating annular spouted fluidized bed has a downwardly tapering funnel shape. The pipe 5 is installed at the center of the reaction chamber, with its axis being vertical and coinciding with the axis of the reaction chamber 2. The annular cross-section of the reaction chamber in any section along the height of the chamber has an outer boundary in the form of a regular polygon. The inner boundary is circular in shape. This cross-sectional shape is determined by the inner space of the reaction chamber that is formed as a set of polyhedrons set on top of each other in the form of regular prisms 4 and/or regular truncated pyramids 4a alternating at random.

Moreover, all the truncated pyramids 4a within the downwardly tapering sections of the reaction chamber 2 are vertex-down. Within the downwardly tapering regions of the reaction chamber 2, any adjacent prisms 4 and/or pyramids 4a sharing a common base plane are characterized the side length at the base of the upper polyhedron that is not shorter than the side length at the base of the lower (adjacent) polyhedron. However, within the downwardly expanding regions of the reaction chamber 2, the geometric characteristics of adjacent prisms 4 and/or pyramids 4a described in this paragraph are apparently opposite.

All the polyhedra are coaxial. Their common axis is the axis of the reaction chamber 2. The adjacent prisms 4 and/or pyramids 4a can be rotated relative to each other around their common axis. The value of the relative rotation angle is determined by the parameters of the technical process, the properties loaded material and reaction products and can vary in a range from zero to ninety degrees. The polygons at the bases of polyhedrons can have a different number of sides, but not less than three, the upper limit is limited only by the complexity of the design and appears to be thirty-two. The preferred number of sides of the base polygon is from four to sixteen. The number of sides of regular polygons at the base of polyhedrons may vary for adjacent polyhedrons. The proposed configuration of the reaction chamber 2 makes it possible to create a stepped structure on its inner surface 3 to facilitate an increase in treatment rate and depth because large non-condensed particles moving down near the inner surface 3 of the reaction chamber 2 can deposit on the steps 13 of the inner surface 3. While on the step, a large particle is exposed to the additional gas flow supplied from the channels 9 along the steps 13. The particle affected by the flow moves (while being additionally treated) along the step to reach its boundary and rolls down upon the nearest lower step 13 to be picked up by the gas flow supplied along this step 13 from the respective channel 9. The process is repeated until the particle is sufficiently grinded and/or treated to the degree it can be removed from the reaction chamber 2 through the pipe 5.

The reaction chamber 2 of the device has no nozzle bottom, which simplifies and cheapens the design. Gas flows are guided into the reaction chamber 2 through the channels 9 passing through the body 3a of the reaction chamber 2 from the outside to the inside. The channels 9 are designed in a way that the supplied gas enters the reaction chamber 2 in the vicinity of the side edge of one of the prisms 4 and/or the pyramids 4a (as close to it as possible), and the velocity vector of the incoming gas flow is parallel to one of the side faces (forming the respective edge) of a polyhedron. This ensures the gases are supplied to the reaction chamber 2 tangentially to the lateral surface (side faces) of the polyhedrons (forming the reaction chamber 2) at the point of entry of the respective gas flow, providing gas—flow circulation (rotation) around the axis of the chamber 2 (pipe 5). Each polyhedron 4 (4a) may have its own channels 9 that may be arranged in the vicinity of each side edge of the polyhedron 4 (4a), and since the side edges are intersections of two side faces, the outlets of two channels 9 can be located near each side edge of the polyhedron 4 or 4a (one channel per side face). In this case, the first channel 9 supplies gas parallel to one side face of the edge, and the second—parallel to the second side face of the same edge.

The design of the device makes it possible to feed gases into the reaction chamber 2 through channels 9 in an independent manner, i.e. they may have different composition, temperature and supply rate, not only at the level of different layer formations 15 of the reaction chamber 2 but also within each formation 15. Independent supply is provided by vertical and horizontal membranes 12 in the space between the shell 1 and body 3a of the reaction chamber 2 and gas ducts 10.

The reaction chamber 2 of proposed design creates a toroidal spouted fluidized bed in the reaction chamber 2 and allows one to adjust the rotation speed of material particles both in the horizontal and vertical plane, as well as to carry out treatment of materials with various gases supplied through different channels 9 independently with respect to the positions of the membranes 12 and gas ducts 10. The membranes 12 can be arranged in a way the channels 9 of layer formations 15 (two or more) are combined into groups. To combine the channels 9 of non-adjacent layers, external gas ducts 10 can be used in the manner known to the art.

Materials are fed into the device through the guiding channels of the lid 7, or through some of the channels 9 using such methods known to the art as screw feeding, pneumatic conveying, etc.

The waste gases and treatment products are removed through the pipe 5 with the holes 6 located preferably in the upper part of the pipe 5. If the pipe 5 passes through the lid 7 and the bottom 17 of the reaction chamber 2, then the discharged gases and treatment products can be directed either down or up through the pipe 5. A discharge in both directions, i.e. up and down, is also possible. If the gases and treatment products are discharged up or down (through one end or face) of the pipe 5, then the second end (face) of the pipe 5 can be used to supply additional reagents and/or materials to the pipe 5 to carry out additional treatment in the pipe 5 and the subsequent pipe space. This treatment requires using additional substances (sorbents, catalysts, quenching gases, etc.) applied through a free end (face) of the pipe 5 (not used for waste gas and treatment products removal). These substances can be fed into the free end (face) of the pipe 5 using the methods known to the art (pneumatic conveying, nozzles, screw feeding, etc.).

Another disadvantage of the fluidized—bed devices known to the art (especially the ones with spouted beds) is that solid-phase sinters may deposit inside the fluidized beds, mainly along the walls. Sinter accumulation in the lower part of the reaction chamber 2 can lead to significant disruptions in device operation manifested, in particular, by rotation speed and pressure jumps inside the reaction chamber 2. The adverse effects intensify if the device operates being loaded 70-80% of its maximum load.

Overcoming this drawback is another objective of the present invention.

Indeed, solid-phase sinters forming in the upper layers of the reaction chamber 2 move toward its walls under centrifugal forces. Near the walls, the sinters moving downward hit against the steps 13. Here, they receive a momentum in the vertical direction whose magnitude increases with the fall distance from one step to another, so a step height is a parameter that determines the vertical component of sinter impact velocity against the underlying step after it is picked up from the overlying step. Hence, the vertical momenta (impacts) break and grind the sinters and their circular movement around the pipe 5 near the inner surface 3 of the reaction chamber 2 also contributes to their grinding, since in course of their circular motion the sinters affected by the centrifugal forces hit against the steps 13 receiving a horizontal momentum from them. Thus, the sinters are crushed due to a combination of impacts in the horizontal and vertical direction. Such grinding stabilizes device operation within a wide range of adjustable loads.

The fluidized bed devices known to the art have one more drawback that is operational instability under sharply changing loads and the difficult restart after a sudden stop caused by a sudden fluidizing gas supply stoppage. In particular, deposition of condensed phases on the nozzle bottom after a sharp decrease or complete stop of fluidizing gas supply can block fluidizing gas inflow to the reaction chamber 2, which may require the device to be restarted. Starting a fluidized-bed device is recommended to be performed in a smooth manner that is achieved by gradually increasing the flow of fluidizing gas and condensed materials. However, this cannot be done if a significant amount of treated material covers the nozzle bottom, which makes it difficult to restart the device (after a sudden stop) and requires special technical operations such as partial removal of reagents and/or materials from the nozzle bottom, or a strong initial fluidizing gas burst. Need for these operations complicates device design, increases its cost, reduces its operational lifetime and, as a whole, worsens the economic performance.

In the present disclosure, the drawback is fixed by the stepped structure of the inner surface 3 of the reaction chamber 2, since when fluidizing gas supply is sharply reduced or completely stopped, solid-phase sinters predominantly deposit on the horizontal sections of the steps 13 of the inner surface 3 of the reaction chamber 2, which means that only a small fraction from the toroidal spout settles on the bottom 17 of the reaction chamber 2. For this reason, restarting the device or switching it to a higher-performance mode can be done more smoothly and at a lower fluidizing—gas flow rate and pressure. To take full advantage of this benefit, the stepped structure of the inner surface 3 of the reaction chamber 2 should be designed in a way the total area of the horizontal sections of steps 13 accommodates a certain part of condensed-phase materials. The size of this area is determined not only by such properties of condensed-phase materials (reagents and treatment products) as the angle of repose, bulk density and others but also by the parameters of the technical process carried out in the reaction chamber 2 (e.g. temperatures, gas flow rates, the amount of condensed-phase material in the reaction chamber 2, etc.). Considering the number and diversity of the said parameters, it is reasonable to select the total area of the horizontal sections of the steps 13, as well as the distribution of these areas along the layer formations 15 of the reaction chamber 2 empirically.

The ramps 16 mounted around the pipe 5 on the bottom 17 of the reaction chamber 2 facilitate the start of the device and the pick-up of the heaviest particles from the bottom of the device by a toroidal spout. The ramps 16 are designed in a way that the heavy particles are accelerated along one of the ramps 16 by a fluidizing gas flow coming from one of the channels 9 of the lower (closest to the bottom) layer formation 15, which directs the flow of fluidizing gas along the respective ramp. Having accelerated on the ramp 16 and moved upward along it, heavy particles lift off in the vicinity of the fluidizing gas flow from the channel 9 following the stream and thus are picked up by the upward flow of the fluidizing spout. This upward flow is generated by tangential inlet flows due to the presence of the bottom 17 of the reaction chamber 2 and the upper arrangement of the holes 6 of the pipe 5 for removal of waste gases from the reaction chamber 2.

The presented drawings are made schematically to give a better understanding of the essence of the present invention. They may have some visual elements that simplify understanding of the device and its components but are unacceptable in the design documentation performed in compliance with the relevant regulatory documents. The provisional nature of these visual elements is obvious to a person skilled in the art.

TERMS AND DEFINITIONS USED

Base plane of polyhedron is the plane that includes the polygon at the base of the polyhedron. The base of a polyhedron is a part of the base plane limited by the polygon at the base.

Prism is a polyhedron whose two faces are congruent (equal) polygons belonging to parallel planes, while the remaining faces are parallelograms having common sides with bases. These parallelograms are called the lateral faces of the prism, and the other two polygons are called its bases. The sides of parallelograms that do not coincide with the sides of the polygons of the bases are called lateral edges.

Direct prism is a prism, where lateral edges are perpendicular to the base plane. A regular prism is a direct prism with a regular polygon at its base. The lateral faces of a regular prism are equal rectangles.

Pyramid is a polyhedron, whose base is a polygon, and the remaining faces (called lateral) are triangles sharing a common vertex. The sides of the triangles opposite to the shared apex match the sides of the base of the pyramid.

Pyramid altitude is a perpendicular falling from the apex to the plane at its base.

Regular pyramid means its base is a regular polygon, and its height passes through the center of the base. All lateral faces of the pyramid, in this case, are isosceles triangles.

Truncated pyramid means a pyramid, whose upper part (including the apex) is cut off (removed) by a plane parallel to the base.

Step is a cusp on an inclined surface (relative to the vertical) with one section close to the horizontal and another—to the vertical.

Stepped structure is a set of cusps (steps) of various configurations arranged in a certain (regular) fashion along the surface inclined relative to the vertical (an inclined surface).

Layer (stratum) of steps—the steps on the same horizontal level.

Layer formation is a part of the reaction chamber body between bases of the pyramids or prisms.

The following terms and definition are introduced mostly to be used in the claims section solely for the sake of brevity and simplicity of understanding of the invention. These terms and definitions may also be used in the text of the description section in general, along with other synonymous terms to better describe the features of the present invention.

The synonyms used in the text are commonly used in the field of technology and are obvious to a person skilled in the art.

Reagents are substances in solid, liquid or gaseous state admitted into the device to perform further treatment and obtain treatment products.

Materials are substances in solid, liquid or gaseous state (e.g., catalysts, sorbents, inert fillers, etc.) admitted to the device to meet the required parameters of a treatment process in the device.

Treated products are substances in solid, liquid or gaseous state removed from the device after reagent treatment. Treated products typically include the results of reagent treatment and untreated residues of reagents and materials used.

Fluidizing gases are substances in gaseous form admitted to the reaction chamber 2 through the channels 9 to generate a rotating annular spouted fluidized bed in the reaction chamber 2 out of solid- and/or liquid-state reagents and materials (if available) and/or to generate a gas flow of desired velocity and/or flow rate and/or direction at the step 13. A single type of gas or a mixture of gases may act as fluidizing one. In the latter case, the mixture may include reagents and materials in gaseous form.

Treatment is a term covering any and all the technical processes to be performed in a device designed to obtain treated products from reagents.

The other terms and definitions are either obvious to a person skilled in the art or explained in the description and drawings.

REFERENCE NUMBERS IN DRAWINGS

1 Device shell;
2 Reaction chamber;
3 Reaction chamber inner surface of stepped structure. In the text it may also be called the 'stepped surface' that provides additional reagent treatment (apart from spout treatment);
3a Reaction chamber body;
4 Regular prism;
4a Regular truncated pyramid. Along with regular pyramid 4 they are called regular polyhedrons;
5 Body of revolution partly placed in the reaction chamber 2. For the sake of simplicity, this structure is referred as a pipe. A part of this structure within the reaction chamber is coaxial with the reaction chamber 2;
6 Holes in the pipe 5. If the pipe 5 does not pass through the lid 7 of the device, then the hole 6 corresponds to the upper end of the pipe 5 (inside the reaction chamber 2);
7 Device lid;
8 Feed channels drawn in closed positions;
8a Access cover to the channels 9;
9 Channels to supply gases to the reaction chamber 2;
10 Ducts to supply gases to the device;
11 Supporting structure of the shell 1;
12 Separating membranes that can be both horizontal and vertical;
13 Reaction chamber inner surface step;
14 Reaction chamber constriction;
15 Layer formation of the body 3a of the reaction chamber 2;
16 Ramp at the bottom of the reaction chamber 2;
17 Reaction chamber bottom;
18 Vertical branch of the pipe 5 partially guiding the products downward from the reaction chamber 2 through the inner cyclone;
19 Inclined branch of the pipe 5 partially guiding the products downward (through the hole in the bottom 17 of the reaction chamber 2) directly from the reaction chamber 2.

BRIEF DESCRIPTION OF DRAWINGS

In FIG. 4, the bottom 17 has the ramps 16, and in FIG. 5, the ramps are absent.

DETAILED DESCRIPTION

The following description is based on preferred embodiments and references the attached drawings. All the embodiments and alternative technical solutions mentioned in the present description both as a whole or in part can be used in any consistent combination without any restrictions, even if not directly mentioned in the present description, but obvious to a person skilled in the art.

Figure 1:
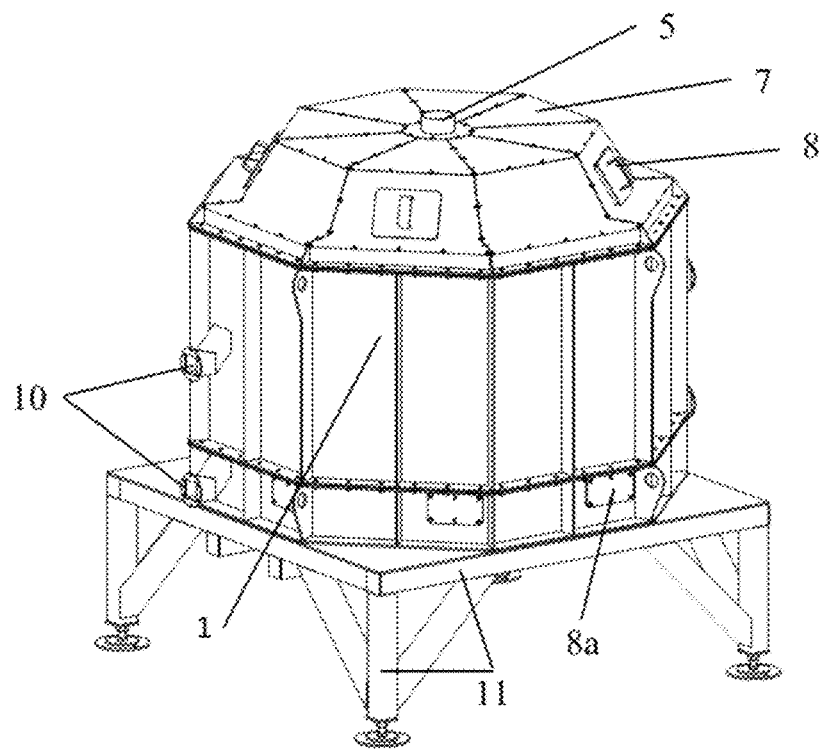
FIGS. 1 and 1a display a simplified axonometric cross-sectional view of a possible implementation of a device with a rotating annular spouted boiling (fluidized) bed, where the central pipe 5 with holes 6 is guided through the top and bottom 17 of the device, and a cross-section of the device (without the supporting structure) by a vertical plane through the axis of the reaction chamber 2.
Figure 1A:
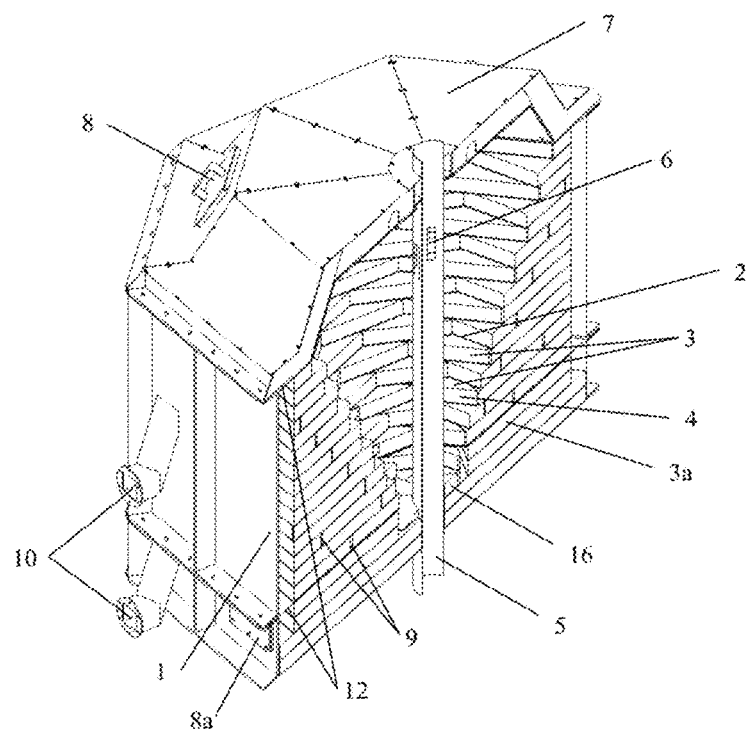
Figure 3:
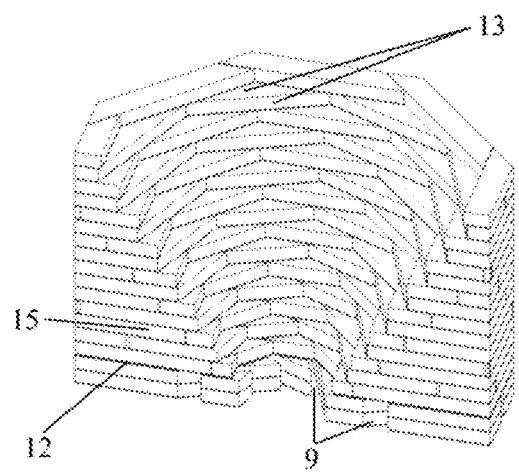
FIGS. 3 and 3a schematically display two implementations of the body 3a of the reaction chamber 2, where different layer formations are used to achieve the desired configuration of the reaction chamber 2 and the stepped structure of the inner surface 3 of the reaction chamber 2.
Figure 3A:
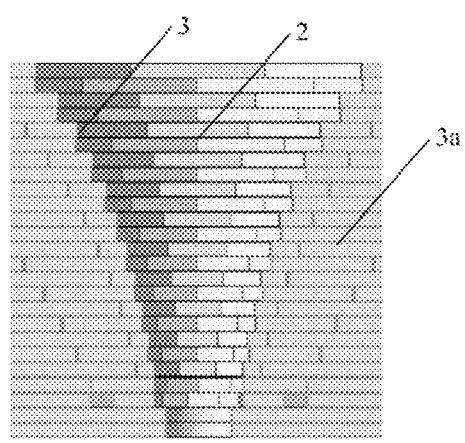
Figure 15:
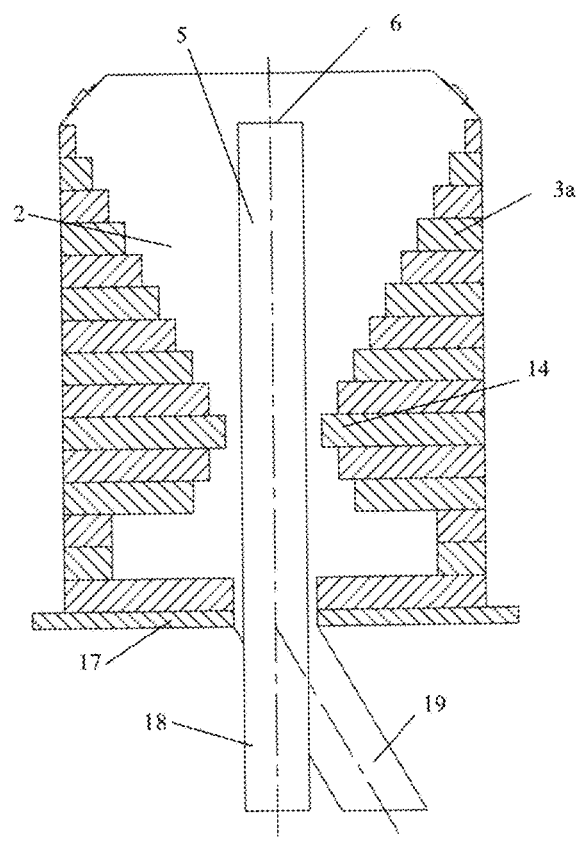
FIG. 15 displays a simplified image of the reaction chamber 2 with constriction 14 that divides the reaction chamber 2 into the upper and the lower part. It is only the upper part of the reaction chamber 2 that has a funnel shape. The lower part (below constriction 14) has the shape suitable for additional treatment of reagents (e.g. drying, grinding, gasification, etc.).

FIG. 1 or FIG. 1a demonstrates that the reaction chamber 2 of a device with a rotating annular spouted fluidized bed has a downwardly tapering funnel-like shape. Since the inner surface 3 of the reaction chamber 2 has a stepped structure, it means the stepped structure is created on a surface shaped in a specific way. This surface, with the stepped structure its top, can be shaped as any surface of rotation with a vertical axis, e.g. a paraboloid, hyperboloid, ellipsoid, or any other surface described or not described by a certain mathematical formula. If the inner surface 3 is a surface of rotation with stepped structure created on its top, it is possible to define its generatrix that belongs to the same plane as the axis of the reaction chamber 2). Any plane line can act as the generatrix, as exemplified in FIG. 3a. Along its height, the inner surface 3 can consist of several alternating sections of conical, parabolic, cylindrical and other shapes. In FIG. 15, an alternative shape of the generatrix can be seen that is difficult to describe by a mathematical formula. In the figure the upper section of the reaction chamber 2 has a downwardly tapering funnel shape and ends with the so-called constriction 14, under which the reaction chamber 2 expands again. It can further expand to the bottom 17 (not shown in FIG. 15), which makes it possible to reference the shape of the reaction chamber as an hourglass. Alternatively, as shown in FIG. 15, the reaction chamber 2 may have a shape expanding (increasing in diameter) below the constriction and then tapering again (decreasing in diameter) towards the bottom 17. In this case, the reaction chamber can be called pitcher-shaped for simplicity's sake. Thus, the reaction chamber 2 may be funnel-shaped only throughout a part of its height (preferably the upper one).

The tangent to the inner surface 3 may have different inclination angles relative to the vertical, i.e. the axis of the reaction chamber 2. The preferred inclination varies from zero to sixty degrees and is chosen based on specific technical and design considerations. The tangent inclination may be different at different points of the generatrix.

This technical solution ensures more stable operating conditions under a wide range of loads since the funnel shape of the stepped structure 3 makes it possible to adjust the reduction of treated—material weight in the rotating toroidal spout upon a sharp decrease of gas flow through the reaction chamber 2. More specifically, when a load on the device (i.e. gas flow rate through the reaction chamber 2) decreases, a part of the fluidized particles within the rotating spout tend to separate from it since the rotating spout is only able to maintain a certain number of particles in fluidized state. In this case, excessive fluidized particles deposit on the stepped surface 3 in a non-uniform manner. The non-uniformity is caused not only by the presence of centrifugal forces of different intensities at various levels along the height of the rotating toroidal spout, but also by the specific shape of the generatrix. For instance, if the angle between the vertical axis of the reaction chamber 2 and the tangent to the generatrix in the upper section exceeds that in the lower part, then the excessive material predominantly deposits at the upper steps 13 of the inner surface 3. Moreover, the channels 9 near the upper steps 13 may be obstructed by the layer of excessive material deposited on the upper steps. At the same time, the channels 9 near the lower steps 13 will still be open or at least much less obstructed. This difference in the level obstruction makes it possible to smoothly increase the gas flow rate through the lower (less obstructed) channels 9, which enables the spout to gradually pick up the excessive material from the upper steps 13 thereby clearing the channels 9 near these steps without sophisticated readjustment procedures.

The capability of such a smooth transition to lower loads with further rollback to the initial values was among the bottlenecks of the prior art.

Reshaping of the inner surface 3, e.g. by changing its curvature sign, is instrumental in achieving the required deposition pattern of excessive fluidized particles at various levels (steps 13) along the height of the reaction chamber 2. Hence, changing loads on the device, a smooth transition from higher to lower loads and vice versa may be achieved.

Apparently, the deposition of excessive fluidized particles on steps 13 reduces the number of particles depositing at the bottom 17 and facilitates the return of the particles removed from the spout and deposited on the bottom 17 back to the spout (upon restart or when the load is increased).

At the center of the reaction chamber 2, a dedicated structure 5 is installed. The purpose of this structure may differ. Depending on its purpose, the shape of the structure 5 may change as well, so, in general, it may be of arbitrary shape. However, the part of structure 5 within the reaction chamber 2 should preferably be shaped as a body of revolution or have a shape close to it, so its axis coincides with that of the reaction chamber 2. This requirement is imposed to minimize the resistance of the structure 5 to the motion of the fluidized bed around the structure 5.

Structure 5 may have different functions, the primary one (or at least one of them) being removal of treated products and waste gases from the reaction chamber 2. For that reason, the structure 5 herein is often referred as "pipe".

The part of the pipe 5 within the reaction chamber 2 may be shaped as an arbitrary surface of rotation, such as a paraboloid, a cone, a cylinder, etc., or composed of a series of different bodies of rotation, which together with the inner surface 3 shape the inner volume and cross-sections of the reaction chamber 2 as required, in other words, the shape of the pipe 5 and the configuration of the reaction chamber 2 determine the shape and parameters of the (spouted) fluidized bed in the reaction chamber 2, in particular, gas flow rate regimes in different vertical sections of the reaction chamber 2, e.g. the reduced area of the annular cross-section of the reaction chamber 2 corresponds to increased vertical velocity components in the spouted fluidized bed. Hence, the shape of the pipe's generatrix that determines the shape of its fragment within the reaction chamber 2 is the parameter to determine the motion of a toroidal spouted fluidized bed. For that reason both the pipe and reaction chamber 2 are to be designed simultaneously based on required treatment parameters, properties of reagents and/or materials, and other operating parameters of the device. In particular, the S-like shape (with different curvature signs) may turn out to be a reasonable solution for the generatrix profile of the pipe 5.

Depending on the type of treatment carried out in the device, the pipe 5 may be guided through the lid 7 of the device, as shown in FIG. 1 and FIG. 1*a*. This design makes it possible to use both outlets (ends, faces) of the pipe 5 coming out of the reaction chamber in the treatment processes. If the pipe 5 is guided through the lid 7 and bottom 17 of the reaction chamber 2, then gases and treatment products may be removed either up or down the pipe 5; removal in both directions is also a possibility. When gases and treatment products are removed up or down the pipe 5 (through one of its ends/faces), its other end (face) may be utilized for performing additional treatment in the pipe 5 and the subsequent pipe space. This additional treatment is possible via supplying additional substances (sorbents, catalysts, quenching gases, etc.) through the idle end (face) of the pipe (not utilized for removal of fluidizing gases and treated products). The additional substances may be admitted to the idle end (face) of the pipe 5 using such methods known to the art as pneumatic conveying, nozzles, screw feeding, etc.

It is reasonable to choose the shape of the pipe 5 within the reaction chamber 2 taking into account not only the necessity of achieving the required configuration of the reaction chamber 2, but also the stages of the treatment process that can be carried out in the inner space of the pipe 5. For example, if the inner space of the pipe 5 is used for additional separation, then the pipe 5 may be designed as a respective separating device, e.g. a prior—art cyclone as displayed in FIG. 13.

The cyclone can be fully placed inside the reaction chamber 2. In this case, it is obvious that all the cyclone's elements forming its exterior surface, should preferably be shaped as bodies of rotation, so the resistance of the cyclone to the rotation of toroidal spouted fluidized bed around the cyclone (i.e. the axis of the reaction chamber 2) will be minimized. It is apparent the internal cyclone should have a pipe (branch) guided through bottom 17 of the reaction chamber 2 in its lower part to ensure the discharge of the separated material from the lower part of the cyclone.

If, for whatever reason, the height of the internal cyclone exceeds that of the reaction chamber 2, the cyclone may be placed in the reaction chamber 2 to the extent allowed by its height. Here, the preferable solution is to place the upper part of the cyclone, in the reaction chamber 2, since it is where key separation processes occur.

Apparently, the inlet element of the internal cyclone (in this case, the holes 6 in the pipe 5) should be placed inside the reaction chamber 2. The lower part of the cyclone including the collection bin for separated material can be set outside the reaction chamber 2 below the bottom 17. It is also obvious that the (gas) outlet mechanism of the internal cyclone should be placed above the lid 7 of the device outside the reaction chamber 2.

Figure 14:
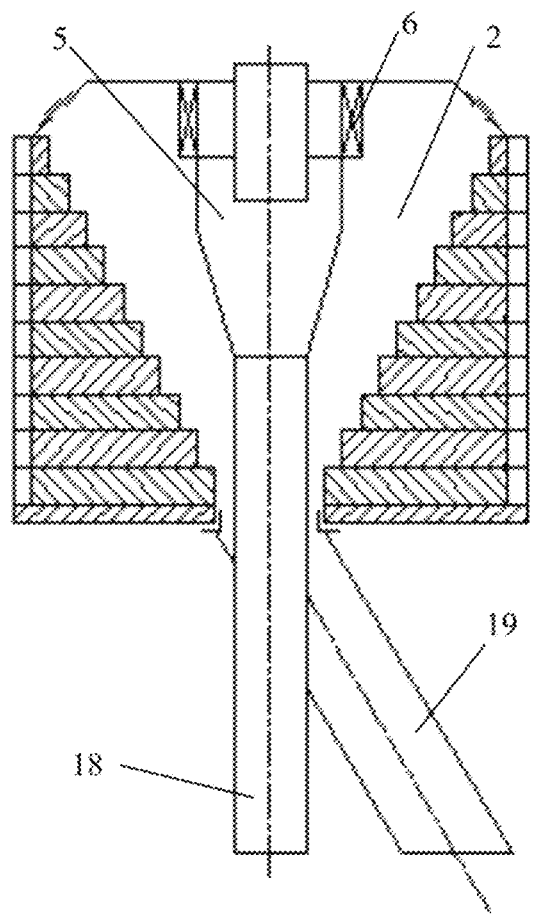
FIG. 14 schematically displays a possible implementation of the device, where the central pipe 5 performs more sophisticated separation than in the embodiment in FIGS. 13 and 13a. The pipe 5 has two outlet branches. One of them is vertical, and the other—inclined. The vertical branch 18 of the pipe 5 guides a part of the treatment products from the reaction chamber 2 downward through the inner cyclone. The inclined branch 19 of the pipe 5 directly removes a part of the treatment products from the reaction chamber 2 downward (through the bottom 17). It is clear from the figure that the pipe 5 may have different shapes depending on its functions. However, a part of the pipe within the reaction chamber 2 should preferably be shaped as a body of revolution or have a shape close to it. Outside the reaction chamber 2, the pipe 5 may be of arbitrary shape.
Figure 14A:
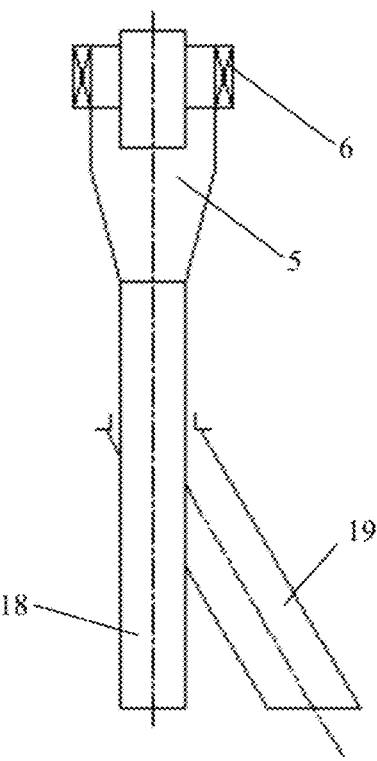
FIG. 14a schematically displays the pipe 5 separately from the device in FIG. 14. The pipe 5 has a shape close to the body of revolution within the reaction chamber 2. The structural parts of the pipe 5 outside the reaction chamber 2 are significantly different from the body of revolution.

Parts of the pipe 5 (including the section implemented as an internal cyclone), which extend beyond the bottom 17 of the reaction chamber 2, may have an arbitrary configuration. These parts of the pipe 5 (outside the reaction chamber 2) should not necessarily be shaped as bodies of revolution. For instance, FIGS. 14 and 14*a* depict a shape of the pipe 5 such that its section outside the reaction chamber 2 (specifically, the lower part in FIGS. 14 and 14*a*) is significantly different from a body of revolution.

Figure 13:
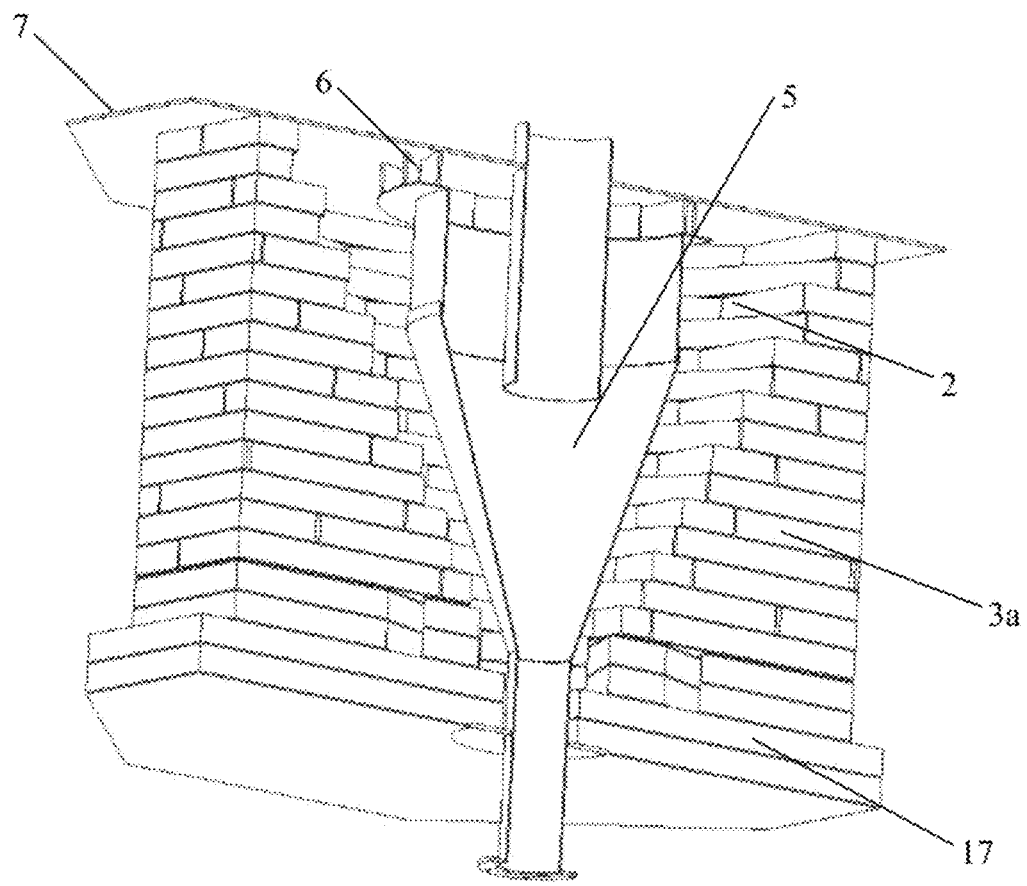
FIGS. 13 and 13a display a simplified axonometric cross-sectional view of a possible implementation of the device with the central pipe 5 shaped as an internal cyclone and guided through the top (lid 7) and bottom (bottom 17) parts of the device. Thus, the pipe 5 in this implementation has two functions, i.e. removal of the treatment products from the device and additional separation of the gaseous and condensed phases with the condensed phases being removed through the bottom 17 of the device and waste gases and gaseous products—through the seal 7 of the device. The pipe 5 in this embodiment acts as an inner cyclone.
Figure 13A:
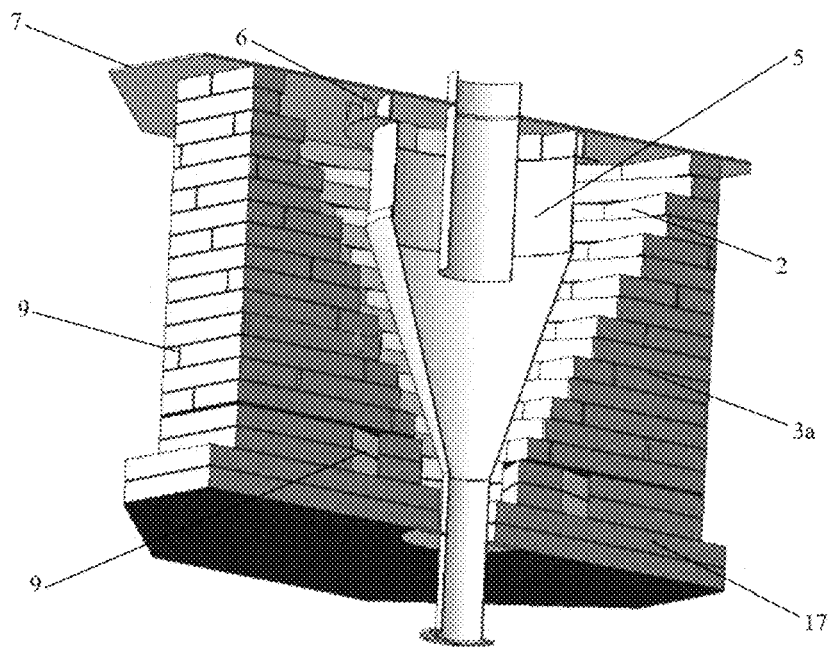

Waste fluidizing gases and treatment products are guided through holes 6 to the pipe 5 and then from the pipe 5 to other prior art devices connected to the pipe 5. If, e.g. the pipe 5 is implemented as an internal cyclone, as shown in FIG. 13 and FIG. 13*a*, then it is possible to separate gases from condensed phase particles in the pipe 5. In this case, waste gases are removed through the upper outlet port (end) of the pipe 5, whereas the separated particles settle down to then be removed through the lower outlet port (end) of the pipe 5 (in this embodiment, the internal cyclone). The pipe 5 shown in FIGS. 14 and 14*a* has a more sophisticated shape. This implementation of the pipe 5 extends its functionality making it possible to perform separation both in the pipe 5 and reaction chamber 2.

The pipe 5 may also be utilized for other treatment processes such as combustion and afterburning. In this case, a possible reasonable solution would be to manufacture the pipe 5 as a prior art cyclone furnace rather than an internal cyclone. This solution makes it possible to supply additional combustion gas, e.g., air, oxygen, or a mixture thereof through one end of the pipe 5, while all treatment products are removed through its opposite. This furnace should preferably be shaped as a body of revolution or have a shape close to that, as long as it will be placed inside the reaction chamber 2 in a coaxial fashion.

If some other treatment processes such as additional purification of waste gases or stabilization of treatment products, is performed in the pipe 5, then additional treatment reagents and/or materials may be supplied in a gaseous form or as (preferably finely dispersed) condensed phases through one of the ends of the pipe 5, while the obtained treatment products in any phases are removed through the opposite end of the pipe 5. In this case, it is also reasonable to shape the pipe 5 as an adequate tool for the treatment chosen to be performed within the pipe 5. Apparently, parts of these devices within the reaction chamber 2 should preferably be shaped as bodies of revolution or encased in vessels shaped as bodies of revolution or have shapes close to those.

It is also reasonable to place the pipe 5 in the central part of the reaction chamber 2, because condensed phases in a rotating spout are driven away from its center to the periphery due to centrifugal forces. In absence of pipe 5, this displacement results in a highly non-uniform distribution of gaseous and condensed phases in the spout. The condensed phases are primarily concentrated away from the rotation axis, while the gases are distributed throughout the whole volume of the reaction chamber 2. As a result, the condensed—phase content in the gas in the axial area of the reaction chamber 2 is lower than in the periphery. Hence, the efficiency of interaction between gaseous and condensed phases decreases. The pipe 5 coaxial with the reaction chamber 2 occupies the central area of the reaction chamber 2 and forces fluidizing gases to the periphery, i.e. towards higher contents of condensed substances, thereby reducing the non-uniformity of their distribution and ensuring a more efficient interaction between the phases in the device.

This technical solution, when the pipe 5 is used for additional technical operations, extends the functionality of the device, reduces the number of the devices in a processing set and the set's dimensions, which the prior art could only achieve by using several individual devices.

Any horizontal cross-section along the height of the reaction chamber 2 (within the height of the pipe 5) is annular-shaped with its outer boundary shaped as a regular polygon. The inner boundary may, in turn, be shaped as a circle with its diameter equal to the outer diameter of the pipe 5 in the respective cross-section, or as a regular polygon.

Figure 12:
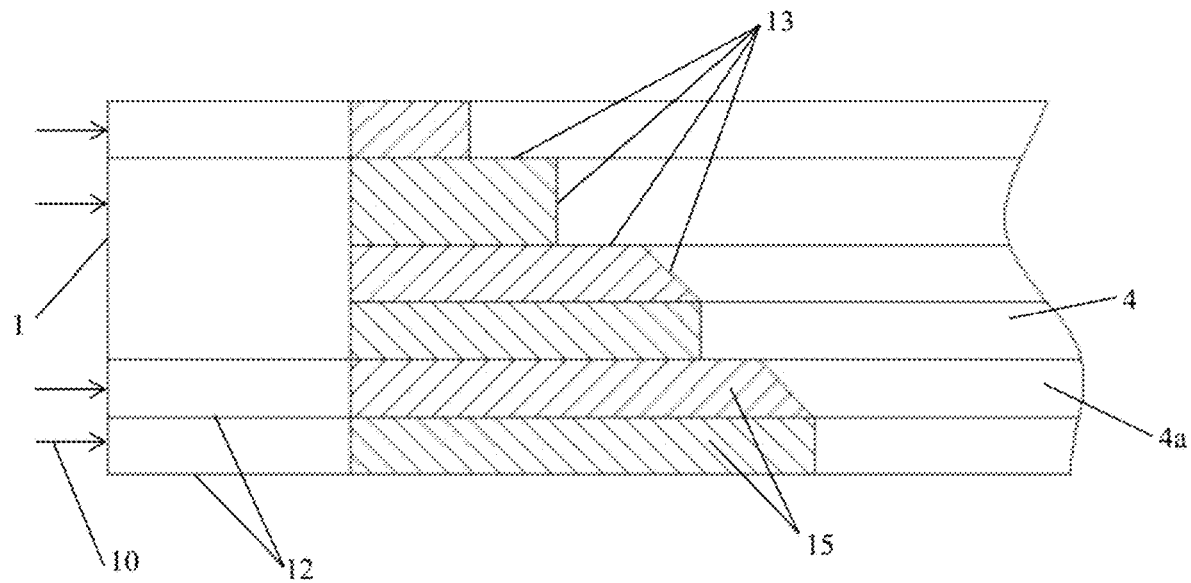
FIG. 12 schematically displays a fragment of a possible implementation of the device including a part of the body with layer formations 15 set to form the desired configuration of the reaction chamber 2; a part of the shell 1 and some horizontal separating membranes 12. In addition, the arrows indicate gas ducts 10 making it possible to separately supply gases to the designated layers 15 (at a certain horizontal level) of the reaction chamber 2. Furthermore, steps 13 of the reaction chamber 2 are shown along with the embodiments of layer formations 15, which make it possible to shape various horizontal slices of the reaction chamber 2 as regular prisms 4 (regular pyramids 4a). Regular prisms 4 and pyramids 4a are collectively referred to as regular polyhedrons.

The cross-section is shaped this way, because the inner volume of the reaction chamber 2 is formed as a set of polyhedrons in the form of regular prisms 4 (regular truncated pyramids 4a) arranged on top of each other at random, e.g. as shown in FIG. 12. All regular polyhedrons are coaxial with the reaction chamber 2.

The reaction chamber 2 has at least one section structured of ordered polyhedrons along the height.

The reaction chamber 2 should have at least one downwardly tapering funnel-shaped section along its height.

The structure of ordered polyhedrons within the downwardly tapering funnel-shaped section of the reaction chamber 2 is formed in a way that for any two adjacent polyhedrons sharing a common base plane, the radius of the circle inscribed in the polygon at the base of the upper polyhedron is not shorter than the radius of the circle circumscribed about the polygon at the base of the lower polyhedron. Moreover, all truncated pyramids 4a within the downwardly tapering funnel-shaped section of the reaction chamber 2 are vertex-down.

The structure of ordered polyhedrons may be formed in a way that all regular polyhedrons have regular polygons with the same number of sides as their bases.

If base polygons of all polyhedrons have the same number of sides, then for any two adjacent prisms 4 (pyramids 4a) sharing a common base plane we can see that the side length at the base of the upper polyhedron is not shorter than the side length at the base of the lower (adjacent) polyhedron.

If base polygons of all polyhedrons have the same number of sides, then the respective sides of these base polygons may be parallel or not parallel. In particular, each lower polyhedron may be rotated around the axis of the reaction chamber 2 relative to the adjacent upper polyhedron by a certain angle so that their respective sides are no longer parallel. Relative rotations of the adjacent polyhedrons may be ordered in a way that each lower polyhedron is rotated in the same direction relative to the upper one throughout at least a portion of the height of the reaction chamber 2.

If the adjacent prisms 4 (pyramids 4a) are rotated against each other around the common axis, then the relative rotation angle is determined by the parameters of a treatment process, properties of reagents and/or materials (if available) and/or treatment products and may range from zero to ninety degrees.

Figure 4:
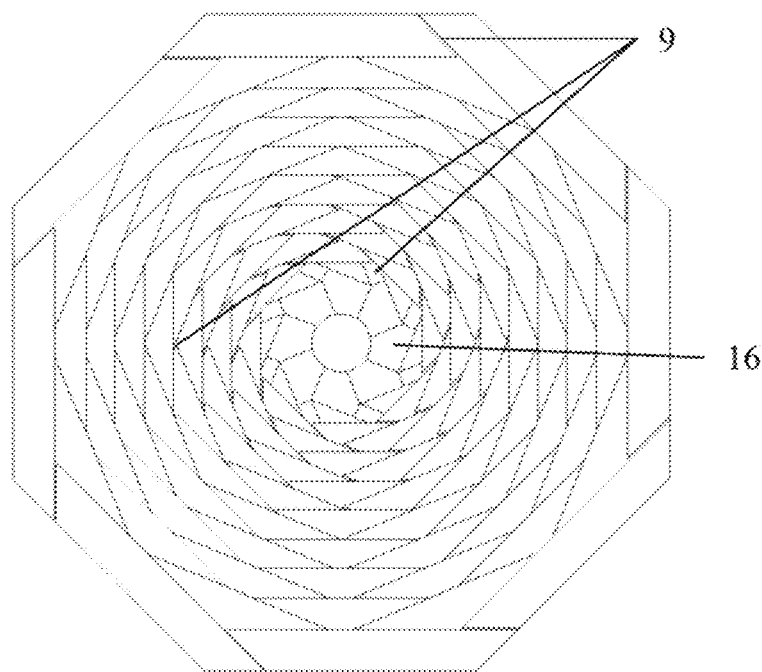
FIGS. 4, 5 schematically display a plan view of two alternative implementations of the reaction chamber 2, where all vertical cross-sections are regular octagons. The implementations have different designs of the chamber's bottom.
Figure 5:
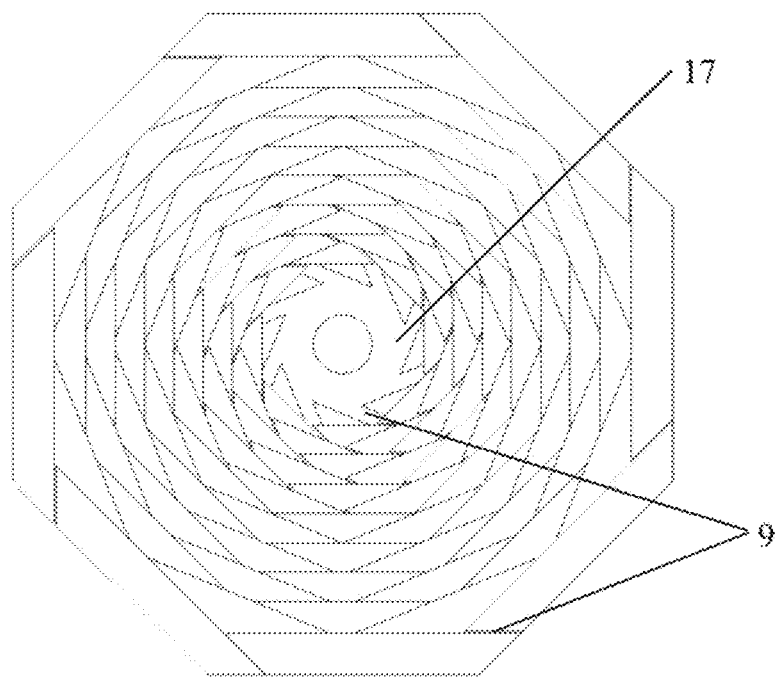
Figure 6:
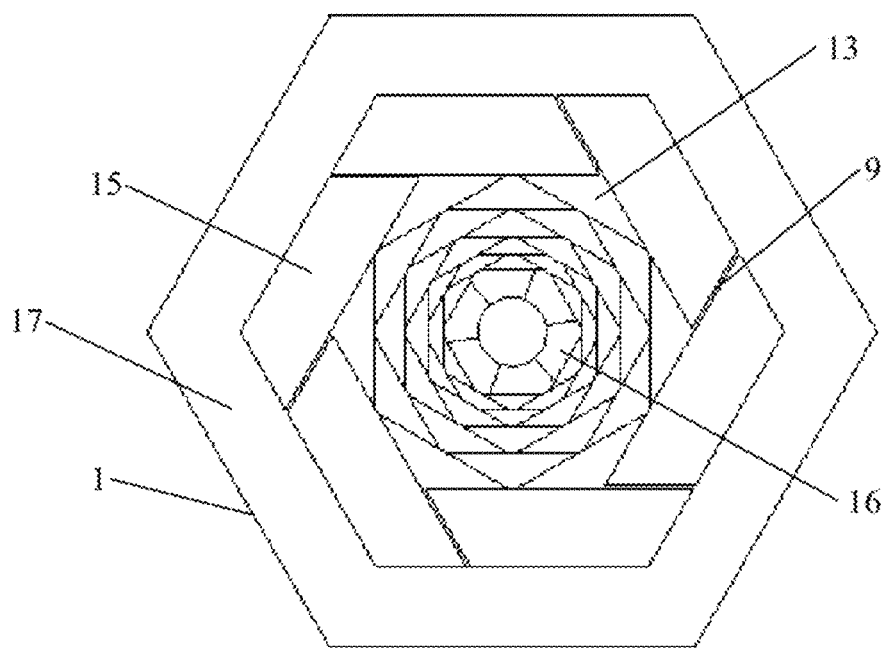
FIG. 6 displays a simplified image of the reaction chamber 2, where all horizontal cross-sections are regular hexagons. Here, in any two adjacent polyhedrons (sharing a common base plane), the upper base polygon of the lower polyhedron is inscribed in the lower base polygon of the upper polyhedron.
Figure 7:
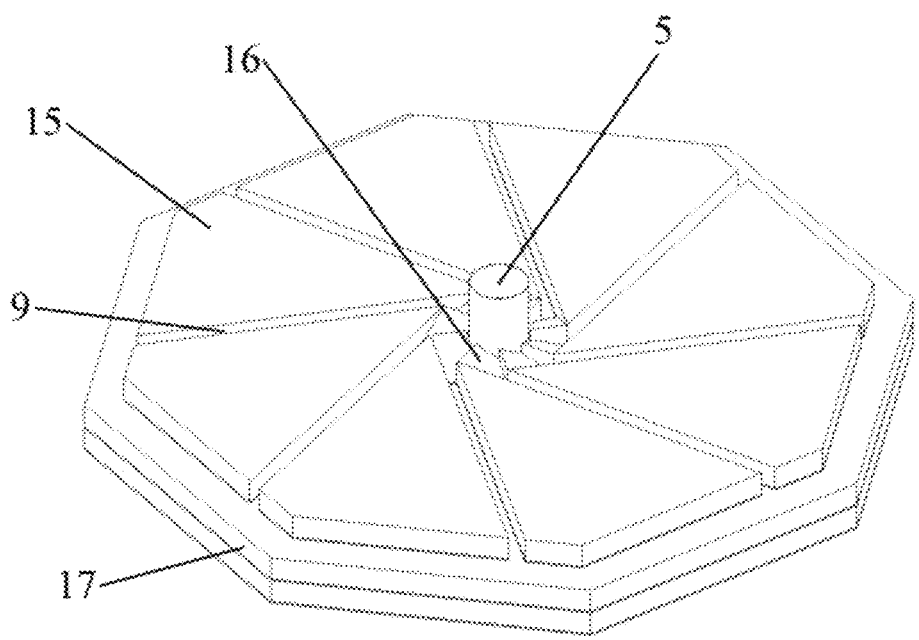
FIG. 7 displays a simplified axonometric view of the layer formation 15 with channels 9 in the body of the device and the base (bottom 17) of the device with ramps 16.

For example, the reaction chamber 2 in FIG. 6 is formed by a set of regular prisms 4 with regular hexagons at their bases. The adjacent prisms in FIG. 6 are rotated against each other by thirty degrees. In FIG. 4 and FIG. 5, for instance, the reaction chamber 2 is formed by a set of regular prisms with regular octahedrons at their bases. The adjacent prisms in FIG. 4 and FIG. 5 are rotated against each other by twenty-two and a half degrees around the axis of the reaction chamber 2.

Figure 8:
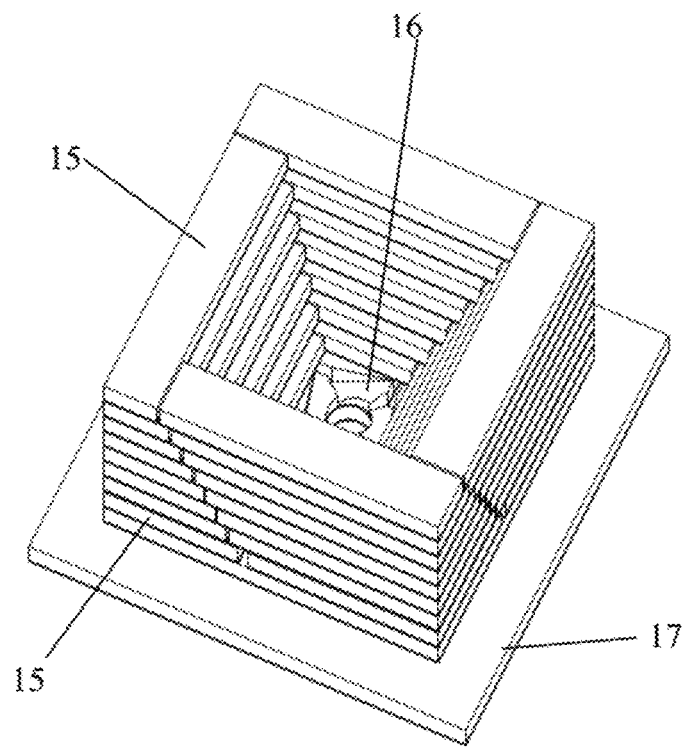
FIG. 8 displays a simplified axonometric view of a possible implementation of the device, where all (horizontal) cross-sections of the reaction chamber 2 are squares.
Figure 9:
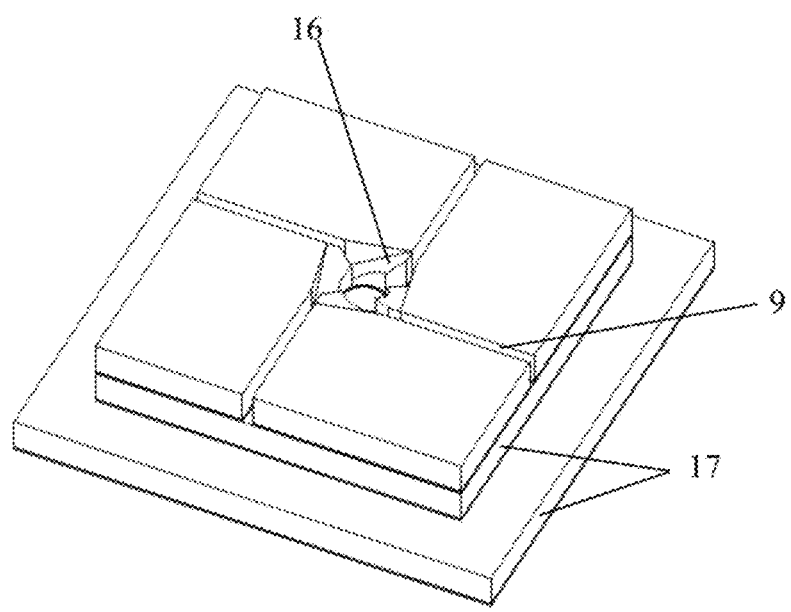
FIG. 9 displays a simplified axonometric view of the lower layer formation 15 (with channels 9), which partially forms the lower prism of the reaction chamber 2 (shaped as a rectangular parallelepiped) shown in FIG. 8. The base (bottom 17) of the reaction chamber 2 with ramps 16 has a two-layer formation.
Figure 10:
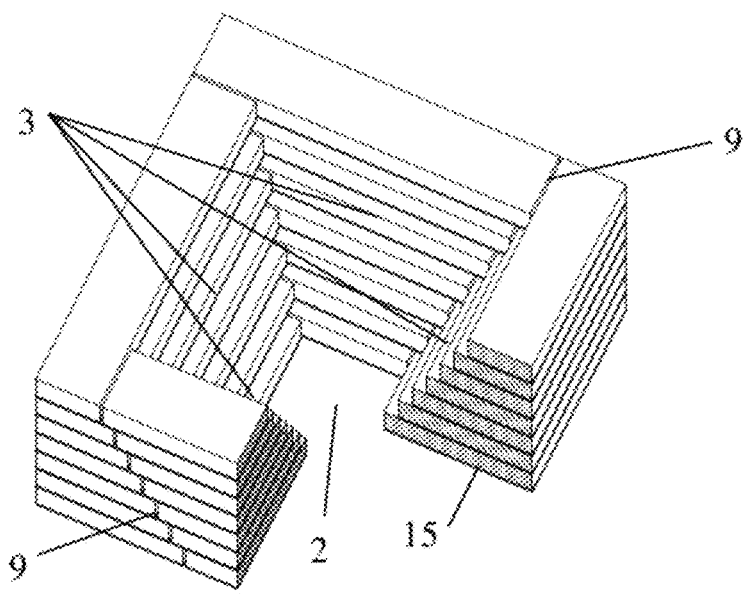
FIG. 10 displays a simplified axonometric view of the reaction chamber 2 with stepped surface 3 for the device in FIG. 8.

The embodiments in FIG. 8 and FIG. 10 present a simplified image of the reaction chamber 2 with its inner volume formed by a set of regular prisms with squares at their bases. The relative rotation angles for the adjacent prisms in FIG. 8 and FIG. 10 are zero or ninety degrees.

It is noteworthy that the polyhedrons from the adjacent layers may have arbitrary relative rotation angles ranging from zero to ninety degrees.

There is a special case for relative positions of adjacent polyhedrons, when the base polygon of one polyhedron is inscribed in the base polygon of another polyhedron in a common base plane of two adjacent polyhedrons. When applied to the downwardly tapering funnel-shaped section of the reaction chamber 2, the base polygon of the lower polyhedron will be the one inscribed. In this case, the adjacent polyhedrons may have regular polygons with a different number of sides at their bases.

Polygons at the base of polyhedrons may have a different number of sides, e.g. eight in FIG. 5, six in FIG. 6, and four in FIG. 8. Apparently, the minimum number of sides in base polygons may not be fewer than three. The same reaction chamber 2 may include the sections shaped as polyhedrons with a different number of sides in their base polygons.

The maximum number of sides in base polygons is only limited by implementation complexity. However, an excessively large number of sides in base polygons leads to their shapes being closer to a circle reducing the impact force of the particles rotating in a toroidal spouted fluidized bed and hitting the steps 13 of the reaction chamber 2. This may result in slower and less efficient destruction of large particles, their sinters and conglomerates. Hence, due to a large number of sides in base polygons of polyhedrons, an important advantage of the present invention, i.e. the efficient destruction of large particles and their clusters, may be lost. Therefore, it is reasonable to restrict the maximum number of sides in the base polygons of polyhedrons to thirty-two. The preferable numbers of sides in base polygons range from four to sixteen. Apparently, if the possibility of sintering while treatment is low or negligible, then the internal volume of the reaction chamber 2 may be formed of regular cylinders and/or truncated cones in addition to regular prisms and regular truncated pyramids.

The number of sides in the regular polygons at the base of polyhedrons may be different for adjacent polyhedrons.

The proposed configuration of the reaction chamber 2 makes it possible to form a stepped structure on its inner surface 3 to facilitate the rate and depth of material treatment in the device. It happens for many reasons and mainly because the large solid particles of treated reagents moving downward near the inner surface 3 of the reaction chamber 2 may deposit on the steps 13 of the inner surface 3. A large particle deposited on the step is exposed to additional gas flow supplied through the channel 9 along the step 13. The particle affected by the flow moves (while being additionally treated) along the step 13 to its boundary (edge). Upon reaching the edge, the particle rolls down upon (and impacts) the nearest lower stage 13, where it is picked up by the gas flow supplied along this stage 13 from the respective channel 9. The process is repeated until the particle is grinded and/or is treated to a degree it can be removed from the reaction chamber 2 through the pipe 5. Considering the described treatment of a reagent particle deposited on a step 13, it is preferable to equip the device such number of channels 9 that at least one channel 9 supplies gas along each horizontal section of the steps 13.

When a particle rolls down from the upper step 13 upon the nearest lower step 13, it hits the lower step's horizontal surface, and the higher the step the particle falls from the stronger the impact, and the stronger the force of the impact, the quicker the particle breaks down into smaller particles and the smaller the size of its fragments, which, as a whole, increases the rate and efficiency of material treatment in the device. Hence, it is reasonable to make steps higher. On the other hand, step height is a parameter that determines the configuration, shape and dimensions of the reaction chamber 2 as well as the intensity of treatment in the reaction chamber 2 in general and on the steps 13 in particular. So, the intensity of treatment in the reaction chamber 2 may be controlled, e.g. by adjusting particle—impact frequency and force. This adjustability depends on the number of steps and their relative heights.

It is also reasonable to set the sizes of channels 9 for each layer formation based on the required velocities and flow rates of the gases supplied through them. The position of a channel 9 should preferably be chosen in a way the channel's axis is parallel to the respective side face of the polyhedron, and the gas flow through the channel has the maximum effect on the horizontal surface of the step the gas propagates along. For this reason, the channel's height may not exceed the height of the layer formation 15, where the channel 9 is implemented. The channel's cross-section may change in shape and dimensions along their lengths based on required gas flow parameters (velocity, direction, and intensity).

This technical solution makes it possible to adjust not only the shape of the reaction chamber 2, but also the dimensions and shape of the horizontal, vertical, and inclined surfaces of steps 13 of the inner surface 3 of the reaction chamber 2. This, in turn, ensures the possibility of adjusting the impact force the treated reagent particles when they hit one another, the steps 13, and material particles if they are available. It is also possible to adjust the particle's dwell time on steps 13, fall distance from one step to another, and, as a result, material treatment intensity of the device. In this respect, the prior art devices provide much less control over material treatment intensity.

The reaction chamber 2 of the device does not have a nozzle bottom, which makes the design simpler and less expensive. Gas flows are supplied to the reaction chamber 2 through the channels 9 guided through the body 3a inside the reaction chamber 2. The outlet ports of the channels 9 are distributed along the height and the perimeter of the inner surface 3. Hence, the design and placement of the channels 9 make it possible to feed gases into the reaction chamber 2 in a pinpoint fashion.

The total number of channels 9 and their distribution along the height and perimeter of the reaction chamber 2 is determined by the parameters of the treatment processes executed in the device. The gases are only supplied inside the reaction chamber 2 through the inner surface 3 of the reaction chamber 2.

The bottom 17 of the device does not have any elements to supply gases inside the reaction chamber 2. However, the bottom 17 of the reaction chamber 2 may have the special projections designed as ramps 16, so the gas flows supplied into the reaction chamber 2 from the lower channels 9 that are closest to the bottom 17 can lift the particles of treated reagents and materials, if available, from the bottom 17 and drive them into the toroidal spout. The embodiments of reaction chambers 2 with ramps 16 are presented in FIGS. 1a, 2, 4, 6, 7, 8, and 9. It is reasonable to place the ramps 16 around the pipe 5 so that each ramp would have a matching gas outlet port of a respective channel 9. The gas flow at each ramp should be directed along the ramp to the extent possible. The number of ramps 16 at the bottom 17 may be more, less, or equal to the number of channels 9 in the lower formation 15 (closest to the bottom 17). The shape and dimensions of the ramps should be chosen to ensure an efficient pick-up of the particles and efficient grinding of the largest and heaviest ones as they regularly hit ramp surfaces. At the same time, the ramps 16 should be shaped in a way to avoid the obstructing outlet ports of channels 9 leading into the reaction chamber 2. The optimal number of ramps 16 at the bottom 17 equals the number of channels 9 in the lower formation 15 (closest to the bottom 17). The Ramps 16 may be considered as steps of specific shape set at the bottom 17.

The inner surface 3 of the reaction chamber 2 is made by forming the body 3a of the device. It is convenient to build the body 3a as a set of formations 15 in a layer-by-layer fashion, as shown in FIG. 3 and FIGS. 6-12.

The material to make the layer formations should be chosen depending on the parameters of the technical processes executed in the device. For high-temperature treatment, it is reasonable to use layer formations made of heat-resistant materials, such as heat-resistant alloys or ceramics. Different layer formations 15 may be made of different construction materials.

It is convenient to implement the channels 9 while building the body 3a. In this case, channels 9 are shaped together with the layer formations 15. The dimensions and shape of the channels 9 are to be chosen based on a required gas flow rate. The height of a channel 9 should not exceed the height of the layer formation 15 it is implemented in.

It is reasonable to design channels 9 so that the supplied gas enters the reaction chamber 2 near the lateral edge of a prism 4 and/or pyramid 4a (preferably as close to that as possible), and the velocity vector of the incoming gas flow would be almost parallel to one of the lateral faces of the polyhedron that forms the respective edge. Thus, it is preferable to set the vector's direction at the point of entry to the reaction chamber 2 as close as possible to the direction of the tangent to the lateral surface of the reaction chamber 2 at this point. This direction ensures the circulation (rotation) of gas flows around the axis of the chamber 2 (i.e. around the pipe 5).

Figure 11:
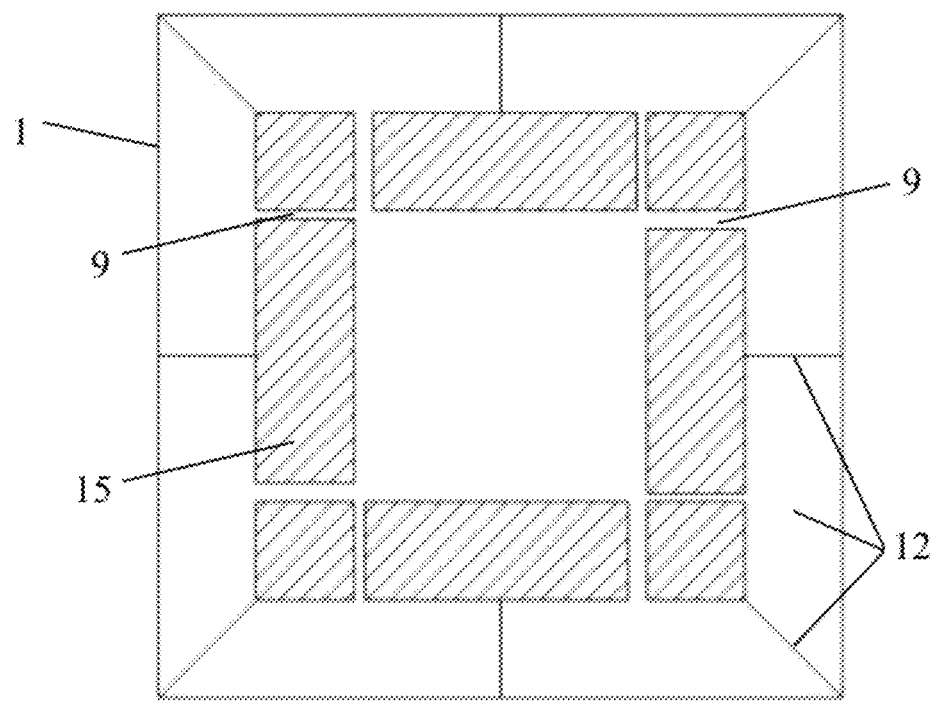
FIG. 11 displays a simplified horizontal cross-section of a possible implementation of the device, where the layer formation 15 has two different systems (groups) of the gas channels 9 switching the rotation direction of fluidized spout around the axis of the reaction chamber 2 to the opposite. The figure also shows the distribution membranes 12 used to supply gases to different groups of channels 9 (when the gas ducts 10 not shown in FIG. 11 are available).

Each polyhedron 4 (4a) may have its own channels 9. These channels 9 may be placed near each lateral edge of the polyhedron 4 (4a). Since the lateral edges of polyhedrons 4 (4a) are formed as the intersections of two lateral faces, it is either one or two channels 9 (i.e. one channel per a lateral face) that may have outlet ports near the lateral edge of the polyhedron 4 (4a). An embodiment with the two channels 9 arranged near each lateral edge of a polyhedron is shown in FIG. 11. The gas, in this case, is guided in parallel to one lateral face of the edge through one channel 9, and in parallel to another lateral face of the same edge through another channel 9, as shown in FIG. 11. Moreover, each channel 9 may have its own dimensions and shape.

Apparently, combining channels 9 into groups using membranes 12 and gas ducts 10 makes it possible to supply gases to the reaction chamber 2 and ensure the rotation of supplied gases around the axis of the reaction chamber 2 (pipe 5) in either one of two opposite directions (provided that two channels 9 are available near each lateral edge of the polyhedron), which makes it possible to arrange a regular reversal of the rotation direction of the toroidal spout around the axis of the reaction chamber 2 and causes an additional laminar-turbulent transition in the flow of particles of treated materials thanks to the gases supplied through the channels 9 in some layer formation 15 against the rotation direction of the toroidal spout in the reaction chamber 2. This local turbulization in the rotating spout makes it possible to intensify the treatment processes inside it.

Thus, the device's design makes it possible to supply gases in different directions in different layer formations 15 to cause rotation in different directions around the axis of the reaction chamber 2 (provided two channels 9 are available near each lateral edge of the polyhedron). It is also possible to supply gases through both channels 9 near the same (each) lateral edge at the same time to adjust the rotation speed of the supplied gas (and of the treated particles) around the axis of the reaction chamber 2 within (each) single layer formation 15 and the total gas flow rate near a (each) single lateral edge. In this case, the rotation speed and gas flow rate may be adjusted independently. It is apparent that combining channels 9 into groups using vertical and horizontal membranes 12 and gas ducts 10 makes it possible to adjust the rotation speed (and direction) and vertical velocities of particles at various levels along the height of spouted fluidized bed.

It is also obvious that the availability of two channels 9 near (each) single lateral edge and of independent adjustable gas supply for each of two channels 9 near the same lateral increases the diversity (potential) of adjusting the vertical velocities and rotation speeds of treated material particles around the axis of the reaction chamber 2 compared to the implementation of the claimed device with only one channel 9 near (each) single lateral edge.

The presence of membranes 12, gas ducts 10, and channels 9 (one or two near each lateral edge), as well as the ability to control gas supply through each channel 9 independently or via gas feed groups (formed by membranes 12 and gas ducts 10), makes it possible to adjust the motion parameters of the toroidal spouted fluidized bed and fluidized particles both within the spout and at steps 13 as required to efficiently perform treatment processes.

For example, when fluidizing gases are admitted to the reaction chamber 2 so that at each layer formation 15 gas supply ensures a similar rotation direction around the axis of the reaction chamber 2, the rotation speed of the spouted fluidized bed around the axis of the reaction chamber 2 may be maximized. Apparently, the centrifugal forces that affect the fluidized particles reach their maximum as well. As a result, the largest particles or sinters and particle conglomerates are more strongly forced to the periphery increasing their impacts against the steps 13 and intensifying their grinding.

In another embodiment of the present invention, gases are supplied into the reaction chamber 2 through channels 9 in different directions (in terms of rotation around the axis of the reaction chamber 2), making it possible to generate a rotating toroidal spouted fluidized bed with minimal rotation speed around the axis of the reaction chamber 2. In this case, the contribution of centrifugal forces to particles separation will be minimized.

The prior art devices provide much less control over the motion parameters (gas velocities and flow rates at various levels along the height) of the rotating toroidal spout.

It is apparent that the number of channels 9 near each lateral edge may differ (from zero to two).

The design of the device makes it possible to supply gases to the reaction chamber 2 through the channels 9 independently (with different compositions, temperatures, velocities, and flow rates) not only at the level of different formations 15 of the reaction chamber 2 but within each forming layer 15 as well. Independent gas supply to channels 9 may be organized, e.g. using vertical and horizontal membranes 12 in the space between the shell 1 and the body 3a of the reaction chamber 2 combined with gas ducts 10, as schematically displayed in FIGS. 11, 12, and 1a.

Each channel 9 may be designed in a way to supply several different gases required for the technical process, e.g. fuel and oxidizer. In this case, the channel 9 may be as coaxial pipes or a single pipe divided into separate channels by longitudinal vertical and/or horizontal walls or in another way known to the art. In this case, gases should be supplied through individual channels (similar to the gas ducts 10) within a common channel 9 in the manner known to the art.

The proposed design of the reaction chamber 2 makes it possible to generate an adjustable toroidal fluidized bed in the reaction chamber 2 with adjustable (rotation) speed of fluidized particles in both horizontal and vertical directions, and carry out reagent treatment using various gases supplied through different channels 9 (or groups of channels 9) independently, provided that the required number and placement of membranes 12 and gas ducts 10 is ensured.

Adjusting the gas supply to the channels 9 of the upper layer formations 15 makes it possible to adjust the rotation speed (in a horizontal plane) of fluidized particles around the axis of the reaction chamber 2 (pipe 5). In this case, the vertical components of fluidized particles velocity change to a much lesser extent, especially near the lower layer formations 15.

Adjusting the gas supply to channels 9 of the lower forming layers 15 makes it possible to adjust both vertical and horizontal components of fluidized particles velocity.

Thus, by ensuring the required gas supply rates in different channels 9 (or groups of channels 9) in various layer formations 15 it is possible to achieve the required motion parameters (i.e. velocities and dwell time) of fluidized particles in the rotating toroidal spout within the reaction chamber 2.

Membranes 12 may be installed to combine the channels 9 of (two or more) adjacent layers 15 into groups. To combine into groups the channels 9 that do not belong to adjacent layers external gas ducts 10 and membranes 12 may be used in the manner known to the art.

Thus, the design of the device makes it possible to perform different treatment stages at different horizontal levels of the reaction chamber 2 under various gas-dynamic conditions unlike the prior art devices, whose potential is much lesser in this respect.

The treated reagents may be supplied into the device through the feed channels in the lid 7 and/or through the channels 9 (accessed through access covers 8a) using such methods known to the art as screw feeding, pneumatic conveying, etc.

Another drawback of the prior art devices is the deposition of solid-phase sinters that may take place inside fluidized beds, primarily along the walls. When depositing in the lower part of the reaction chamber 2, the sinters may cause significant malfunction of the device manifested, in particular, in velocity and pressure jumps inside the reaction chamber 2. The adverse effects of sinter formation are especially strong when the device is operated under loads of less than 70-80% of the maximum one.

Overcoming this drawback is among the objectives of the present invention.

Indeed, the sinters forming in the upper layers of the reaction chamber 2 are driven by centrifugal forces toward its walls. Near the walls of the reaction chamber 2, the sinters moving downward hit against the steps 13 and receive a momentum in the vertical direction to get grinded. The sinters' radial movement around the pipe 5 near the inner surface 3 of the reaction chamber 2 contributes to their further grinding as well, since during this circular motion the sinters are affected by the centrifugal forces hit against the steps 13 and receive a horizontal momentum. In other words, the sinters are crushed due to a combination of impacts they receive in the horizontal and vertical directions. The grinding stabilizes the operation of the device in a wide range of adjustable loads. In this respect, the present invention has a much higher potential than the prior art devices.

Another disadvantage of the prior art devices is instability of operation under sharply changing loads and the difficulty of restarting the device after a sudden fluidizing gas supply stoppage. In this case, condensed phases can fully settle on the nozzle bottom following a sharp decrease or complete stop of fluidizing gas supply, thereby blocking the supply of the fluidizing gas to the reaction chamber 2. In this case, a restart of the device is required. It is preferable to start a fluidized bed device smoothly by gradually increasing the flow of fluidizing gas and condensed materials, which cannot be done while a restart since a significant amount of condensed-phase material covers the nozzle bottom. The restart (after a sudden stop) may require special technical operations, e.g. partial removal of reagents and/or materials (if available) from the nozzle bottom, or a strong initial fluidizing gas burst. Such operations complicate the design of the equipment, increase its cost, reduce the operational lifetime and, ultimately, worsen its economic performance.

In the present invention, the drawback is fixed by the stepped structure of the inner surface 3 of the reaction chamber 2, since when the supply of the fluidizing gas is sharply reduced or completely stopped, condensed-phase fluidized particles are predominantly deposited on the horizontal sections of the steps 13 of the inner surface 3 of the reaction chamber 2, so only a small fraction of condensed-phase particles from the toroidal spout deposits on the bottom 17 of the reaction chamber 2. For this reason, restarting the device or switching to higher-performance mode can be done more smoothly and with a lower flow rate and pressure of the fluidizing gas. To take full advantage of this benefit of the present invention, the stepped structure of the inner surface 3 of the reaction chamber 2 should be designed in a way the total area of the horizontal sections of steps 13 is sufficient to accommodate a certain amount of fluidized particles. The size of this area is determined not only by such properties of condensed-phase particles (reagents, materials and treatment products) as the angle of repose, bulk density and others but also by the parameters of the treatment process carried out in the reaction chamber 2 (e.g. temperatures, gas flow rates, the amount of condensed-phase substance in the reaction chamber 2, etc.) so, it is reasonable to select the total area of the horizontal sections of the steps 13, the height of steps 13, as well as the distribution of these areas along the layer formations 15 of the reaction chamber 2 empirically.

The ramps 16 mounted around the pipe 5 on the bottom 17 of the reaction chamber 2 facilitate the start of the device (even after a sudden stop) and the pick-up of particles (including the heaviest ones) from the bottom of the device by the toroidal spout. The ramps 16 are designed so that the heavy particles are accelerated along one of the ramps 16 by a fluidizing gas flow directed along the said ramp through the channels 9 of the lower (closest to the bottom) layer formation 15 and the channels 9 of the above laying formations if the ramp is high enough.

Having accelerated on the ramp 16 and moved upward along it, heavy particles detach from it in the vicinity of the fluidizing gas flow from the next channel 9 along the flow direction and thus are picked up by the upward flow of the fluidizing spout. This upward flow is generated by the tangential inlet flows due to the presence of the bottom 17 of the reaction chamber 2 and the upper arrangement of the outlet holes 6 of the pipe 5 for removal of waste gases from the reaction chamber 2. As they come out of the channels 9, fluidizing gases move radially upward (due to the bottom 17 below) to the outlet holes 6 of the pipe 5 in the upper section of the reaction chamber 2. As a result, an upward fluidized spout rotating around the axis of the reaction chamber 2 (pipe 5) is generated by fluidizing gases, in which the particles of the treated reagents and materials (if available) are fluidized.

Figure 2:
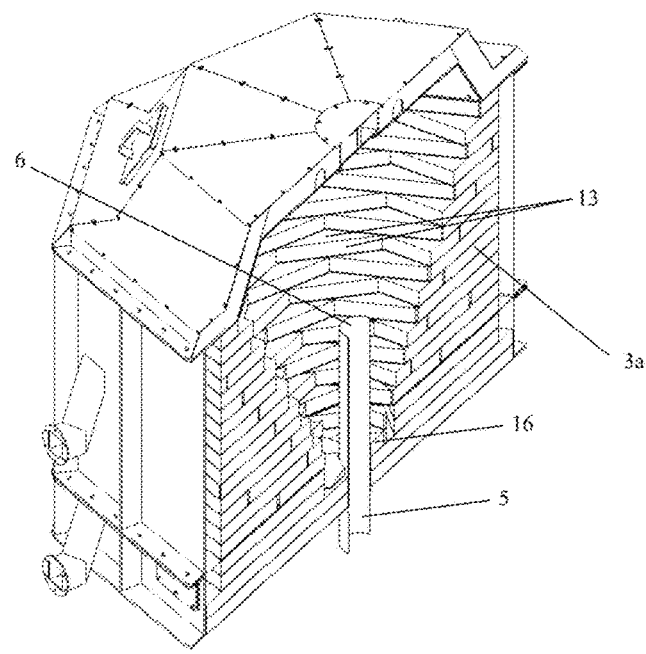
FIG. 2 schematically displays an alternative implementation of the device, where the central pipe 5 has its upper end placed within the chamber and does not reach the top of the device (lid 7). Here, the upper end of the pipe 5 forms the hole 6.

The implementation of the claimed method is considered using the embodiments presented in FIGS. 1, 1a, and 2.

It should be noted beforehand that major differences in properties (bulk density, density of particulate matter, porosity, size, shape, etc.) of various reagents and materials make it difficult to accurately calculate and numerically simulate the parameters of the device and treatment processes inside it (such as flow rate of fluidizing gases supplied through the reaction chamber 2, their temperature, distribution of flow rates of gases supplied to the reaction chamber 2 along the height of the reaction chamber 2 (i.e. its forming layers 15) through gas admission channels 9, the number and placement of gas ducts 10, the number and placement of membranes 12, the shape of the reaction chamber 2, the shape and number of steps 13 on the stepped inner surface 3, the shape of the stepped surface 3, and other parameters that determine the design of the device and the characteristics of the technical processes performed inside it) in a lot of cases, which is why they have to be picked empirically depending on treated reagents and type of treatment.

The embodiments below do not exhaust all possible applications of the device. Aside from these embodiments, the device may be used in other treatment processes otherwise performed using similar devices from the described technical field or adjacent fields, if this application is obvious to a person skilled in the art.

Embodiment 1 is an embodiment covered in most detail. The remaining embodiment s are described in detail by the scope of their differences from the set of equipment and operation of the device as per Embodiment 1. It is implied here that general operating principles of similar devices are known and obvious to a person skilled in the art, and the same holds for the typical sets of additional equipment required to perform specific treatment processes in similar devices.

Due to obviousness, not all the embodiments below include detailed descriptions of the sets of known additional equipment required for the claimed device. It is implied that these sets of equipment are known and obvious to a person skilled in the art.

It is also implied that additional equipment listed in any of the embodiments below may just as likely be used in any other embodiments, even if it is not mentioned in the latter but its necessity is obvious to a person skilled in the art.

The embodiments below describe various implementations of the claimed device and methods for reagent treatment used therein. The differences, however, are united by a single inventive concept and can, therefore, be implemented (applied) in a specific implementation of the claimed device in any reasonable combination, considering the performed treatment process, as well as reagents and, if available, materials involved in the said treatment process, no matter in which section of the present description they are introduced, in which embodiment below they are described, and in which figure they are depicted.

The term 'peripheral equipment' is used in the embodiments below. In the context of the claimed invention, the peripheral equipment implies any known additional equipment (any known device), which interacts with the claimed device and is necessary for operation of the claimed device, as required by the treatment process, carried out in the claimed device. If any peripheral equipment is necessary (in terms of its use in a specific application), but is not mentioned in the embodiments below, then it is implied that the presence of (need for) this equipment is obvious to a person skilled in the art and is omitted from the description of embodiments for brevity sake and to focus on specific features of the claimed invention per se.

DETAILED DESCRIPTION OF THE PREFERRED EMBODIMENTS

Embodiment 1

The embodiment presented in FIGS. 1, 1a, and 2 may be used for obtaining thermal energy via combustion of fairly large pieces of fuel preferably of homogeneous composition and low bulk density, e.g. biofuel grains (pellets), woodchip, and other similar types of fuel.

The list of peripheral equipment to be connected to the device in FIGS. 1 and 1a to carry out the described process should include (at least) as follows:

Fuel supply devices known to the art to ensure adjustable fuel supply to the reaction chamber 2 connected through one or several feed channels by flange connections in the access cover of feed channels 8;

Ignition (pilot) devices known to the art such as pilot burners using liquid or gaseous fuel (started and stopped remotely via the automatic control system), installed in channels 9 (leaving a gap) so that oxidizer (e.g. air) is supplied in amounts sufficient for operation through channel 9, in which they are installed, and connected through one or several gas supply channels 9 of the lowest (closest to the bottom 17) layer formation 15 by flange connections in the access covers 8a;

Devices known to the art such as blow fans for supplying oxidizers (e.g. air, oxygen, or mixtures thereof) connected through flanges in the gas supply ducts 10 with adjustable oxidizer flow rate controlled individually for each gas duct 10 independently from the other gas ducts 10;

Devices known to the art to remove (solid and gaseous) combustion products (e.g. draft fan) connected through the lower end (face) of the pipe 5;

Devices known to the art for extraction of thermal energy from combustion products, for separation (isolation) and purification of combustion products, and other devices (e.g. for capturing carbon dioxide), as required by the general specification of the technical process, installed on the way of combustion products from the lower end of the pipe 5 to the device for removal of combustion products (with their number and placement determined by the general specification of the technical process);

The upper end of the pipe 5 may be closed (in this case, the device in FIGS. 1 and 1a operates similarly to the device in FIG. 2) or may open into a pipeline supplying the known additional reagents and/or materials to ensure the implementation of specific stages of the treatment process (e.g. purification of flue gases from sulfur oxides, nitrogen oxides, carbon monoxide, etc.) in the pipe 5.

The device should be equipped with a control system supporting (manual or preferably automatic) adjustment of all actuators and ensuring synchronous operation of oxidizer supply devices and combustion product removal devices to maintain a constant (small) vacuum (relative to the atmosphere in the room, where the device is installed) in the reaction chamber 2 to protect the room from hazardous components of combustion products and ensure stable operation of burners.

The start of the device initiates the gas supply devices and combustion product removal devices in modes ensuring the stable operation of the ignition devices (burners). Then, pilot devices (burners) are initiated. At the same time (or slightly later), the burners intended to operate constantly throughout the whole duration of a treatment process in the reaction chamber 2 may be initiated. The temperature in the reaction chamber 2 (in this embodiment, the combustion chamber) and (preferably) the temperature of combustion products in the pipe 5 (preferably near the holes 6) are controlled (using such temperature measurement devices known to the art as thermocouples, pyrometers, etc.). When the reaction chamber 2 is heated to the auto-ignition temperature of the fuel (e.g., preferably above 500° C. for biofuel grains), the fuel is supplied to the reaction chamber 2. The fuel, e.g. biofuel grains, supplied to the upper steps 13 of the inner surface 3 of the reaction chamber 2 and exposed to gas flow from channels 9 to the step 13 where the fuel particles arrive, to gas flow in the reaction chamber 2 (gases in a rotating spout), and to impacts from other particles, starts moving along the step 13 towards the rotating spout. As it reaches the step's edge, the fuel particle falls onto the lower step 13 due to gravity and the process is repeated until the particle rolling down from yet another step is either caught in an upward gas flow of the spout, which breaks its fall or reaches the bottom of the reaction chamber 2 (or ramp 16 at the bottom 17 of the reaction chamber 2).

As a fuel particle moves along steps 13, gasification and pyrolysis processes (release of volatile combustible components) are initiated so the particle ignites. As it moves in the rotating fluidized spout and rolls down the steps 13, the fuel particle is exposed to numerous impacts, which contribute to its grinding, removal of ash from its surface, and, as a result, faster combustion. The full combustion of heavier particles takes more time, due to their longer dwell times on steps 13 of the reaction chamber 2. Hence, the fuel particles are treated not only in the rotating spout but on steps 13 (and ramps 16, if available) on the inner surface 3 of the reaction chamber 2 as well.

Burnt fuel particles become volatile ash particles and are carried by the flow of waste fluidizing gases (in this case, flue gases) through the holes 6 into the pipe 5 and are then removed from the device through its lower end (face).

The heaviest fuel particles roll down the steps 13 to the bottom 17 of the reaction chamber 2. If the bottom 17 has ramps 16, then the heaviest particles rotating around the pipe 5 near the bottom 17 jump along ramps 16 and are thus subjected to multiple impacts against the surfaces of ramps 16. As a result of these impacts, they are grinded (with simultaneous combustion) and picked up by the fluidized spout, where they are fully burnt.

During the start and operation of the claimed device, combustion of fuel and generation of the rotating spouted fluidized bed from the burning fuel are visually inspected (through windows in the covers of feed channels 8, and/or surveillance cameras installed in the said covers). The combustion process and the fluidized bed are controlled by adjusting the fuel supply rate and gas flow rate through the reaction chamber 2.

Gas flow rate through the reaction chamber 2 is adjusted through each gas supply duct 10 individually and through all gas ducts 10 collectively to ensure the motion parameters (e.g. velocity) of the rotating spouted fluidized fuel bed around the pipe 5 and the intensity (e.g. height) of the spout as required by the specification of the treatment process (in this case, combustion). When the required motion parameters of reagents (in this case fuel) and fluidizing gases in the reaction chamber 2 are ensured, the control system is switched to maintaining the set parameters. Pilot burners are turned off.

The constant small vacuum maintained in the combustion chamber 2 makes it possible to detach (remove) the turned off pilot burners. On the other hand, these burners may operate continuously throughout the burning process. The necessity for constant operation of pilot burners (or special burners intended for constant operation) during fuel combustion may occur, e.g., when high-moisture (and/or high-ash) fuel is used, i.e. when self-sustained combustion cannot be achieved due to high moisture (and/or ash) content in fuel. In this case, the ignition (pilot) burners with appropriate performance parameters should be available to ensure their constant operation. Alternatively, a part of burners (not necessarily pilot burners) should have the required parameters, and then these burners are used to operate continuously throughout the whole process.

Devices known to the art control the composition of combustion products during the treatment process. Depending on the composition of combustion products, the supply of additional substances (reagents) to the pipe 5 through its upper end (face) is adjusted using the known devices connected to the upper end (face) of the pipe 5 to achieve the desired composition of treatment (combustion) products.

It is preferable to install means of visual inspection (windows, surveillance cameras, etc.) to observe the process performed in the reaction chamber 2 not only in the covers of the feed channels 8, which close the upper feed channels with no supply devices installed but also in the flange connections of feed mechanisms connecting the said mechanisms to the upper feed channels 8. These installations make it possible to visually inspect not only the processes in the reaction chamber 2 but also the fuel supply to the reaction chamber 2.

The described embodiment may use pilot burners of any known type, including electric ones and those equipped with electric glow (heating) elements to ignite oxidizers.

Embodiment 2

The embodiment presented in FIGS. 1 and 1*a* may be used for burning finely dispersed or pulverized fuels, such as sander dust from furniture production, sawdust, fine peat, coal dust and other similar combustible materials. In this case, the claimed device should preferably be equipped with underfeed mechanisms for supplying raw materials (finely dispersed fuel). For this purpose, the known feeding mechanisms (e.g. screw feeding, pneumatic conveying, etc.) should preferably be mounted in the bottom section of the device. To install the supply devices, some channels 9 in the lower layer formations 15 (near the bottom 17) may be utilized or additional channels for installation (mounting) of feeding mechanism elements should be set in the layer formation 15, through which the finely dispersed fuel is supplied to the reaction chamber 2. Apparently, the channels 9 should have the shape and dimensions making it possible to install the said feeding mechanisms. The flanges should also be available on the shell of the device making it possible to perform inspection and replacement of fuel supply devices (feeding mechanisms), as well as other maintenance operations. It is also obvious that the flanges should be designed in a way to ensure the required gas proofness (sealing) of the device's shell. All feeding mechanisms should preferably be dismountable, and the areas of the housing, where they are installed, should be equipped with flanges with covers (e.g. similar to the access covers 8*a* for channels 9).

When finely dispersed fuels are burnt, it is reasonable to place the feeding mechanism as close to the bottom 17 of the reaction chamber 2 as possible for better fuel combustion. The farther the outlet ports (to the reaction chamber 2) of feeding mechanisms from the holes 6 of the pipe 5, the longer the dwell time of fuel in the reaction chamber 2 and the lower the possibility of unburnt fuel escaping from the reaction chamber 2. It is reasonable to place several feeding mechanisms throughout the perimeter of the reaction chamber to ensure a more uniform temperature field within the reaction chamber 2. It is also reasonable to combine fuel supply channels with channels 9 supplying gases to the reaction chamber 2.

In all other respects, the considered embodiment is similar to Embodiment 1.

Embodiment 2 also makes it possible to burn gaseous and liquid fuels, which requires the use of such devices known to the art as nozzles for supplying liquid and gaseous fuels. It is also obvious that the embodiment (if equipped with adequate feeding mechanisms) makes it possible to burn different fuels (i.e. solid, liquid, and gaseous ones) in various combinations at the same time.

Embodiment 3

When finely dispersed fuels with a relatively low combustion rate such as ash, graphite dust, coal dust from some coals, etc., are burnt it may occur the fuel particles do not have time to burn out either in the reaction chamber 2 or in the pipe 5 even when additional oxidizer is supplied through the upper end of the pipe 5. In this case, it is reasonable to burn these slow-burning fuels in the rotating annular spouted fluidized bed formed by a catalyst or inert non-combustible particles. For this purpose, in addition to the equipment listed for Embodiments 1 and 2, it is reasonable to equip the embodiment with the catalyst or inert material feeding mechanisms known to the art that are installed through the flanges of the upper feed channels (in FIGS. 1 and 1*a* these channels 8 are shown in closed position) similarly to the feeding mechanisms from Embodiment 1.

In this case, the start of the device initiates the gas supply and combustion product removal devices in the modes that ensure not only the stable operation of ignition devices (burners) but also the generation of a rotating annular spouted fluidized bed from a catalyst (or inert particles). To fulfill the latter conditions, a known combustion catalyst (or inert filler) is selected, which best suits the performed combustion process and has appropriate performance parameters (such as bulk density, porosity, etc.) to maintain the rotating annular spouted fluidized bed. The generation depends not only on the properties of the catalyst (or inert filler) but also on fluidizing gas flow rate through the reaction chamber 2. For this reason, when gas supply devices and combustion product removal devices are initiated, pilot burners remain functional, similar to Embodiment 1, and the catalyst (inert filler) is supplied to the reaction chamber 2. Visual inspection using the means described in Embodiment 1 makes it possible to achieve stable operation of both pilot burners and fluidized bed. Continuous or batch feeding of the catalyst (inert filler) to the reaction chamber 2 may be used to supply the volume of the catalyst or inert filler required by the technical process. In this case, adjusting the fluidizing gas flow rate through the reaction chamber 2 ensures the stability of both burners and fluidized bed. When the catalyst (inert filler) and the reaction chamber 2 are heated to the fuel ignition temperature, the fuel is supplied to the reaction chamber 2. Then, the process is carried in a way similar to Embodiment 1 taking into account the specific features of Embodiment 2. Similar to Embodiment 2, the method described in this embodiment makes it possible to burn different fuels (i.e. solid, liquid, and gaseous ones) in any combination.

Embodiment 4

The device equipped as per Embodiment 1 may be used for drying of bulk materials (such as pome seeds, legumes, wet sawdust, etc.). For this purpose, the flow rate of fluidizing (and at the same time drying) gases through the reaction chamber 2 is set empirically to ensure drying of wet materials (with high bulk densities) in a rotating annular spouted fluidized bed and removal of the dried materials (with reduced bulk densities due to moisture loss) through the holes 6 in the pipe 5 or through the upper end (face) of the pipe 5 if the pipe 5 is implemented as shown in FIG. 2. If the upper end of the pipe 5 does not reach the lid 7 of the device, i.e. is located inside of the reaction chamber 2, then the length of the section of the pipe 5 within the reaction chamber 2 should be sufficient for generating a stable rotating spout around it and for ensuring a sufficient dwell time of the treated materials in the spout. It is preferable to set the length of the section of the pipe 5 within the reaction chamber 2 to at least 75% of the height of the reaction chamber 2. The same holds for preferable placement of the holes 6 in the pipe 5, which should be placed closer to the upper end (face) of the pipe 5. The distance from the lower edges of the holes 6 in the pipe 5 to the bottom 17 of the reaction chamber 2 should be at least 75% of the distance (height) from the bottom 17 of the reaction chamber to the device's lid 7.

Then, the dried product and waste fluidizing gases (drying agent or drying gas) are guided through the lower end (face) of the pipe 5 to the device known to the art (e.g. a cyclone), where the dried material is separated from the waste drying agent (drying gas). Then, the finished (dried) product is guided through the handling mechanism of the separating device to the warehouse, and the waste drying gas is guided through the discharge mechanism of the separating device to the known gas removal (suction) device (e.g. draft fan, suction fan, etc.).

There is no need to use oxidizers for drying of the materials. The drying gases are chosen depending on the treated materials. For example, sawdust may be dried using the flue gases generated by burners (using liquid or gaseous fuels). In this case, the oxygen content of such gases should be minimized to prevent the dried material from ignition.

When foodstuff is dried, it is preferable to use electric heaters for drying gases and/or choose neutral gases (such as nitrogen) as drying agents (to prevent the food from contamination while drying). This solution eliminates both the possibility of ignition and excessive oxidation of electric heating elements (if they have metal casings).

It is also obvious that the materials may be dried without any additional devices for heating of drying gases, e.g. by non-heated atmospheric air. In this case, there is no need in any additional devices for heating of drying gases and they (the devices) may be turned off or even be excluded from the set of equipment to come with the embodiment.

Embodiment 5

The treatment methods described for the embodiments above can also be implemented in the embodiment shown in FIG. 13 and FIG. 13*a*. The device in FIG. 13 and FIG. 13*a* has the pipe 5 implemented as an internal cyclone. This implementation makes it possible to perform the first separation stage within the volume of the reaction chamber 2. This solution makes it possible to reduce not only the heat loss (when the embodiment is used for burning of materials) inevitable in the case of an external placement of the cyclone but also the dimensions of the entire system to incorporate the embodiment. The degree of separation (isolation) of waste gases and condensed—phase products also increases, since an additional (internal) separation device may be subsequently connected to the external devices separating waste gases from the condensed phase products.

When the pipe 5 is implemented as an internal cyclone, the devices for the removal of waste products (gases) must be connected to the upper end (face) of the pipe 5 (i.e. the gas outlet of the cyclone) unlike the embodiments above. The condensed phase materials separated in the cyclone will settle in the lower part of the cyclone and will be removed from the device through its lower outlet (the lower end of the pipe 5). The condensed-phase materials should be removed from the claimed device through the lower outlet of the cyclone (pipe 5) using the known sluice devices located further on the route of the removed materials and not shown in the drawings.

The shape of the inner cyclone must be designed in coordination with the shape of the reaction chamber 2 to ensure the required motion parameters of the fluidized spout in the reaction chamber 2, and efficiently carry out separation (isolation) processes in the pipe 5 additionally acting as a cyclone. In particular, the shape of the section of the inner cyclone within the reaction chamber 2 should be as close as possible to the body of revolution.

Embodiment 6

The method described in Embodiment 2 makes it possible to burn materials with low ash fusion temperature such as the vegetable materials whose ash contains compounds of halides with alkali or alkaline-earth metals. These materials may be burnt using the embodiment shown schematically in FIGS. 14 and 14a.

It can be seen from FIG. 14a that the pipe 5 (additionally acting as an internal cyclone) has a more sophisticated configuration, which extends its functionality (in combination with the reaction chamber 2) in terms of separation of substances, thereby expanding the scope of possible applications of the embodiment. FIG. 14a demonstrates that the portion of the pipe 5 outside the reaction chamber 2 may have an arbitrary shape (significantly different from a body of revolution). However, the portion of the pipe 5 within the reaction chamber 2 should still have a shape close to a body of revolution.

The operation of the embodiment is similar to that of Embodiment 2. The temperature in the reaction chamber 2 has to be maintained to liquidize low-melting ash components. Molten—ash drops are forced by the centrifugal forces arising in the rotating fluidized bed to the periphery of the reaction chamber 2, where they deposit on steps 13 to become larger as they stick together and flow down the steps 13 to the bottom 17 of the reaction chamber 2 in the form of large drops or jets. Then, they enter the inclined branch 19 of the pipe 5 through an opening in the bottom 17 and are removed from the device to the receiving tank. The inclined branch 19 should be sufficiently insulated so that the molten ash reaches the receiving tank. The branch 19 and the receiving tank should be made in a way to maintain the required gas density of the inner space of the reaction chamber 2 (since the reaction chamber 2 is connected to the branch 19 through an opening in the bottom 17 of the reaction chamber 2). This requirement can be fulfilled, e.g. by using the sluice devices known to the art.

Dust-like high-melting volatile ash particles are guided into the inner cyclone (pipe 5) through the holes 6 (implemented as the inlet mechanism of the internal cyclone), separated (isolated) from the gas flow in the cyclone (pipe 5) and settle onto the lower part of the cyclone to be removed through the vertical outlet branch 18 of the pipe 5. The removal of high-fusion particles through the vertical branch 18 should also be carried out using the sluice devices known to the art to ensure that the inner space of the claimed device is sealed as required.

The waste gas flow is removed from the internal cyclone (pipe 5) through its upper outlet port (upper end of pipe 5).

The configuration of the embodiment's branches 18 and 19 shown in FIGS. 14 and 14a may be different (due to the requirements of the performed treatment process, the properties of the treated materials, the set of peripheral equipment, etc.). For example, the branch 18 shown in FIGS. 14 and 14a may be inclined rather than vertical, while the branch 19 may be vertical rather than inclined, or both pipes may be inclined, or have a more sophisticated configuration.

The pipe 5 should not necessarily be implemented as an internal cyclone, as shown in FIGS. 14 and 14a but have the shape as shown in FIG. 1 or FIG. 2. In this case, the purpose of the branches 18 and 19 can change in an obvious way depending on a specific technical process and a set of peripheral equipment.

Embodiment 7

To demonstrate the possibility to apply the claimed device for various technical processes using almost the same complete set of peripheral equipment, consider separating pome crops (target product) from volatile (shell, husk, etc.) and heavy (soil particle as sand, small stones, etc.) impurities. For this purpose, the embodiment shown in FIGS. 14 and 14a (similar to Embodiment 6) equipped as Embodiment 4 is used.

The treated material is supplied into the device through the upper feeding mechanism, as in Embodiment 1.

The motion parameters of a rotating spouted fluidized bed in the device are empirically selected so that the target product is guided to the internal cyclone together with volatile impurities, whereas heavy impurities drop down the reaction chamber 2 and are removed from the device through a hole in the bottom 17.

Volatile impurities and the target product are separated in the internal cyclone in a way the impurities together with the waste separating gas flow are removed through the upper end of the pipe 5 (i.e. gas outlet of the internal cyclone), and the target product settles down the internal cyclone and is removed from the device through the branch 18 (lower end of the pipe 5).

Embodiment 8

To demonstrate the possibility of carrying out additional technical operations in various parts of the reaction chamber 2 (including on its inner surface) consider fuel combustion as in Embodiment 1 such as burning of polydisperse fuel (such as low-grade coal or coal-containing waste of rather high density) in the device schematically shown in FIG. 15. When the fuel is burnt, it is preferable to perform its preliminary separation, grinding and gasification. For these purposes, the fuel is fed into the lower part of the reaction chamber 2 (below the constriction 14) using a feeding mechanism installed in the lower part of the reaction chamber 2. The fuel is supplied through a part of the channels 9 below the constriction 14 or through independent feed channels designed in part of the reaction chamber 2. Feeding may be performed using the known feeding mechanisms intended for supplying the burnt fuel. In general, the combustion process is similar to that described for Embodiment 1, except for a sufficient gas flow should be supplied through the channels 9 in the lower part of the reaction chamber 2 (below the constriction 14) to generate a toroidal bed from the treated fuel rotating near the stepped surface 3 (under centrifugal forces). Rotating fuel particles are grinded as they hit one another and against the steps 13 until they are small enough to be carried by gas flows through the constriction 14 from the lower to the upper part of the reaction chamber 2. As they enter the upper funnel-shaped part of the chamber 2, the (grinded) particles are treated (burnt) as in Embodiment 1.

The treatment process can be intensified if the temperature required to initiate gasification (release of volatile components) in the fuel is maintained in the lower part of the reaction chamber 2 (below the constriction 14).

Optionally, additional materials can be added to the combusted fuel to accelerate the grinding of fuel particles and/or gasification of the fuel.

Optionally, the hole in the bottom 17 with attached pipe branch 19 to it may be used to remove ash, ore particles and other non-volatile materials, e.g. the chipped pieces of the steps 13 and the fragmented particles of the additional materials supplied with fuel.

It is obvious that the pipe 5 in this embodiment may be of different shape and fulfill the same functions as in the other embodiments.

The described embodiments and their sets of supplementary equipment are not intended to be exhaustive. It is obvious that all the design features essential for the present invention may be used in a specific implementation of the claimed device altogether (in any number and combination), if it is reasonable from the perspective of the performed treatment process, operating convenience, and maintenance, or justified by any technical, technological, economic or other considerations. It is also obvious that this combination should not be inconsistent (from technical, technological, or any other point of view).

The invention claimed is:

1. A device, comprising:
   an annular spouted fluidized bed;
   at least one feeding channel for reagents, fluidizing gases and, if necessary, further materials; and
   a vertically arranged reaction chamber (2) having at least throughout a part of its height a downwardly tapering funnel shape, which includes a pipe (5) coaxial with the reaction chamber (2) with at least one hole (6) for removal of treated products,
   wherein an inner surface (3) of the reaction chamber (2) has a stepped structure,
   wherein the pipe (5) is guided through a bottom (17) of the reaction chamber (2), and
   wherein the device has additional channels (9) for supplying the fluidizing gases and/or the further materials and/or the reagents passing through a body (3a) of the reaction chamber (2).

2. The device according to claim 1,
   wherein the stepped structure of the inner surface (3) of the reaction chamber (2) is formed so that an internal volume of the reaction chamber (2) is shaped as regular polyhedrons coaxial with the reaction chamber (2) and placed on top of each other.

3. The device according to claim 2,
   wherein throughout the height of the reaction chamber (2) there is at least one section with an ordered structure of polyhedrons.

4. The device according to claim 3,
   wherein the ordered structure of polyhedrons within the downwardly tapering funnel-shaped portion of the reaction chamber (2) is formed so that for any two adjacent polyhedrons sharing a common base plane, a radius of a circle inscribed in the polygon at the base of the upper polyhedron is not shorter than a radius of a circle circumscribed about the polygon at the base of the lower polyhedron.

5. The device according to claim 3,
   wherein the ordered structure of polyhedrons is formed in a way that all regular polyhedrons have regular polygons with the same number of sides at their bases.

6. The device according to claim 5,
   wherein the respective sides of base polygons of all regular polyhedrons are parallel.

7. The device according to claim 5,
   wherein each lower polyhedron is rotated around an axis of the reaction chamber (2) with respect to the adjacent upper polyhedron by a certain angle thereby deviating from the parallel positions of the respective sides of base polygons.

8. The device according to claim 1,
   wherein a part of the pipe (5) within the reaction chamber (2) is shaped as a body of revolution relative to an axis of the reaction chamber (2).

9. The device according to claim 1,
   wherein the pipe is guided through the bottom (17) and a lid (7) of the reaction chamber (2), and the holes (6) for removal of treatment products, the fluidizing gases, and, if available, the further materials are implemented in an upper part of the pipe (5) in its lateral surface.

10. The device according to claim 1,
    wherein the pipe (5) is guided through the bottom (17) of the reaction chamber (2) and does not reach a lid (7), while treatment products, the fluidizing gases, and, if available, the further materials are removed through the hole (6) formed by an open upper end of the pipe (5).

11. The device according to claim 1,
    wherein the device has an additional hole in the bottom (17) coaxial with the opening guiding the pipe (5) through the bottom (17) that ensures a partial removal of treatment products from the reaction chamber (2).

12. The device according to claim 1,
    wherein outlet ports of the additional channels (9) to the reaction chamber (2) are arranged in an ordered fashion along the height and throughout a perimeter of the reaction chamber (2).

13. The device according to claim 12,
    wherein the outlet ports of the additional channels (9) to the reaction chamber (2) are placed near vertical edges of polyhedrons.

14. The device according to claim 13,
    wherein two or less of the outlet ports of different channels (9) are placed near each vertical edge of a polyhedron.

15. The device according to claim 14,
    wherein each outlet port of the channel (9) to the reaction chamber (2) is placed so that the gas flow from the channel (9) is predominantly directed along one of the faces of a polyhedron that forms the edge, near which the channel (9) enters the reaction chamber (2).

16. The device according to claim 1,
    wherein membranes (12) are installed between a shell (1) and the body (3a) of the reaction chamber (2) to ensure an independent gas supply through the channels (9).

17. The device according to claim 16, wherein the membranes (12) are arranged either horizontally or vertically.

18. The device according to claim 1,
    wherein ramps (16) are placed on the bottom (17) of the reaction chamber (2) for lifting reagent particles of and, if available, further materials to the spouted bed.

19. A method of reagent treatment in a device with annular spouted fluidized bed, comprising:
    feeding of reagents and, if available, further materials into the device;
    supplying of fluidizing gases into the device;
    generation of a rotating annular spouted fluidized bed from the reagents and, if available, the other materials in the device;
    treatment of the reagents and removal of treated products, the fluidizing gases, and, if available, the further materials from the device,
    wherein the reagent treatment is performed in the device according to claim 1 in both the annular spouted fluidized bed and outside the fluidized bed on the step-structured inner surface (3) of the reaction chamber (2).

20. The method according to claim 19, wherein the treatment on the inner surface of the reaction chamber (2) is performed so that the flow of fluidizing gases, reagents, and materials is guided onto steps (13) of the reaction chamber (2) through channels (9) to move particles of reagents, materials and treated products from one step to another and into the fluidized bed with a certain velocity; and wherein the process is repeated until a given degree of reagent treatment is achieved, and the treated products, the fluidizing gases, and, if available, the further materials are then removed through the holes (6) in an upper part of the pipe (5).

\* \* \* \* \*